United States Patent [19]

El-Gohary

[11] 4,387,425

[45] Jun. 7, 1983

[54] MASTERLESS AND CONTENTIONLESS COMPUTER NETWORK

[75] Inventor: Hussein T. El-Gohary, Harvard, Mass.

[73] Assignee: Data General Corporation, Westboro, Mass.

[21] Appl. No.: 150,713

[22] Filed: May 19, 1980

[51] Int. Cl.[3] .................. G06F 15/16; G06F 3/04; H04J 6/02
[52] U.S. Cl. .................................... 364/200; 370/85
[58] Field of Search ........................... 370/85, 86, 13; 364/200 MS File, 900 MS File

[56] References Cited

U.S. PATENT DOCUMENTS

| | | | |
|---|---|---|---|
| 3,611,161 | 10/1971 | Claxton | 328/139 |
| 4,017,841 | 4/1977 | Jensen | 364/900 |
| 4,047,246 | 9/1977 | Kerllenevich et al. | 364/200 |
| 4,058,681 | 11/1977 | Imaizumi et al. | 370/85 |
| 4,212,057 | 7/1980 | Devlin et al. | 364/200 |
| 4,223,380 | 9/1980 | Antonaccio et al. | 364/200 |
| 4,271,465 | 6/1981 | Ohtsuka et al. | 364/200 |
| 4,281,380 | 7/1981 | DeMesa et al. | 364/200 |

Primary Examiner—Eddie P. Chan
Attorney, Agent, or Firm—Jacob Frank; Joel Wall; Irving M. Kriegsman

[57] ABSTRACT

A computer network is disclosed in which a plurality of computer stations are interconnected by a single bus and wherein access to the bus is controlled by the computer stations themselves through an adapter unit at each station. Each adapter unit is assigned a unique number. When the network is running normally, control of the bus is continually passed from one live adapter unit to another in numerical sequence and the bus is active with messages, control signals or status signals from the particular adapter unit that happens to be in control at the time. If, for any reason, there should be no activity on the bus for a preselected time interval, all adapter units detecting this condition enter an election mode to elect from amongst themselves one adapter unit to assume control and resume activity. In the election mode, each participating adapter unit sends a pulse out over the bus and then monitors the bus for activity for a time period directly proportional to its assigned number. The first adapter unit whose time period expires without detecting activity is the winner and sends another pulse out over the bus causing the other participating adapter units to detect activity before their time periods expire and thus become losers in the election. Each adapter unit includes a line activity indicator for monitoring the bus for activity, a timer for measuring time, a switch which is used in generate pulses and circuitry for interfacing the computer at its associated station to the bus.

31 Claims, 26 Drawing Figures

STATE DIAGRAM

MASTERLESS AND CONTENTIONLESS COMPUTER NETWORK

BACKGROUND OF THE INVENTION

The present invention relates generally to computer networks and more particularly to computer networks of the type in which a plurality of geographically dispersed computer stations are interconnected for interstation communications by a single bi-directional bus.

In recent years a number of different types of computer networks have been proposed and in some cases actually implemented wherein a plurality of geographically dispersed computer stations are interconnected either for communication purposes or for collectively performing system tasks from different locations or for sharing a data storage facility at one of the computer stations. If the network is one in which computer stations are relatively close, that is, within around one kilometer from each other, the network is often called a local computer network.

In one type of local computer network, the computer stations are interconnected by a single bi-directional bus which is used by the stations in a message or packet switching mode. Some of the advantages of the single bi-directional bus type network are its low cost, its overall simplicity and its capability for easily adding or removing computer stations when desired or required. In the single bus bi-directional network, all station-to-station communications, including status and control signals, take place over the bus. A message can be sent by any computer station connected to the bus and can be received by every other computer station connected to the bus. Only one message, however, can be transmitted over the bus at one time. If two or more computer stations attempt to send messages over the bus at the same time, the messages will collide and be lost. In addition, the colliding messages may create a new message which is different from all of the original messages. The new message may be received by an intended recipient of one of the original messages or even by a computer station that was not intended to be a recipient of any of the original messages. Therefore, in the operation of a single bi-directional bus network it is necessary that access to the bus by the computer stations be controlled.

A number of different techniques have been devised for controlling access to the bus in a single bi-directional bus network. As far as is known, however, no technique has been devised which is completely reliable as far as performance is concerned.

In one prior art technique, known as the selection technique, a computer station may access the bus only when it has been signalled that it is its turn to do so. In one class of networks using this technique, the signals placing the computer station in control are generated by a central controller unit and then sent to the various computer stations either by a daisy chaining arrangement, by a polling arrangement or by an arrangement known as independent requests. In another class of networks using this technique, there is no central controller unit. Instead, the control logic is distributed evenly among the computer stations. The control signals which are generated by the computer stations are set from one to the other by daisy chaining, by polling or by independent requests. The main problem with the selection technique for controlling access is that the network is completely dependent on the operation of one unit. If the network includes a central controller unit and the central controller unit fails, the network is inoperative. If the network does not contain a central controller unit and the computer station in temporary control fails, the network is inoperative.

In another prior art technique known as the random access technique, a computer station desiring to access the bus does not have to wait until it is placed in control but simply monitors the bus for activity. If there is activity, the computer station waits. If there is no activity for a predetermined time interval, the computer station assumes the bus is clear and transmits its message. The problem with this technique is that, because of the axiomatic relationship between time and space that "one cannot be in more than one place at a given point in time", two (or more) computer stations can arrive at the same conclusion that the bus is clear at approximately the same time and access the bus simultaneously. When this happens, the two messages will collide and be lost.

In still another prior art technique known as the reservation technique, a computer station desiring to transmit a message places a request to do so and then receives a future reserved time during which it may transmit its message. The main problems with this technique are that it is dependent on the operation of the unit through which the requests must be made and is relatively slow.

As can be appreciated, the selection technique suffers in that the network operation is dependent on one unit for continuous operation, the random access technique suffers in that it is subject to collision situations and the reservation technique suffers in that it is relatively slow and that the network is dependent on one unit for continuous operation.

A more detailed discussion of the above techniques may be found in an article entitled Global Bus Computer Communication Techniques by E. C. Luczak appearing in the 1978 I.E.E.E.

For many proposed or actual applications, a single bus network is needed which does not merely eliminate or reduce one shortcoming at the expense of creating another but rather does not possess any of the aforementioned problems or limitations. The present invention provides such a network.

SUMMARY OF THE INVENTION

It is an object of this invention to provide a new and improved computer network.

It is another object of this invention to provide a new and improved computer network of the type in which a plurality of computer stations are interconnected by a single bus.

It is another object of this invention to provide a computer network in which a plurality of computer stations are interconnected by a single bus and wherein access to the bus is controlled by a scheme that is completely reliable.

It is still another object of this invention to provide a computer network in which a plurality of computer stations are interconnected by a single bus and wherein access to the bus is controlled by a scheme which is not dependent on the operation of a central controller unit or a master computer station and is not subject to collision situations.

It is another object of this invention to provide a novel scheme for enabling a plurality of computer stations connected to a single bus to decide amongst themselves which computer station should be in control of the bus.

It is still another object of this invention to provide an adapter unit for connecting a computer station to a single bi-directional network transmission bus and controlling its access to the bus.

It is yet still another object of this invention to provide a new and improved phase locked loop circuit.

A computer network constructed according to this invention includes a single bi-directional bus and a plurality of computer stations. Each computer station includes a computer and an adapter unit. Each adapter unit includes a line activity indicator for monitoring the bus for activity, a timer for measuring time of inactivity over the bus, means for generating pulses, control logic and interface logic circuitry.

BRIEF DESCRIPTION OF THE DRAWINGS

While the novel features of this invention are set forth with particularity in the appended claims, the invention both as to organization and content will be better understood and appreciated along with other objects and features thereof from the following detailed description taken in conjunction with the drawings in which like reference numerals represent like parts and wherein:

DETAILED DESCRIPTION OF PREFERRED EMBODIMENTS

Figure 1:
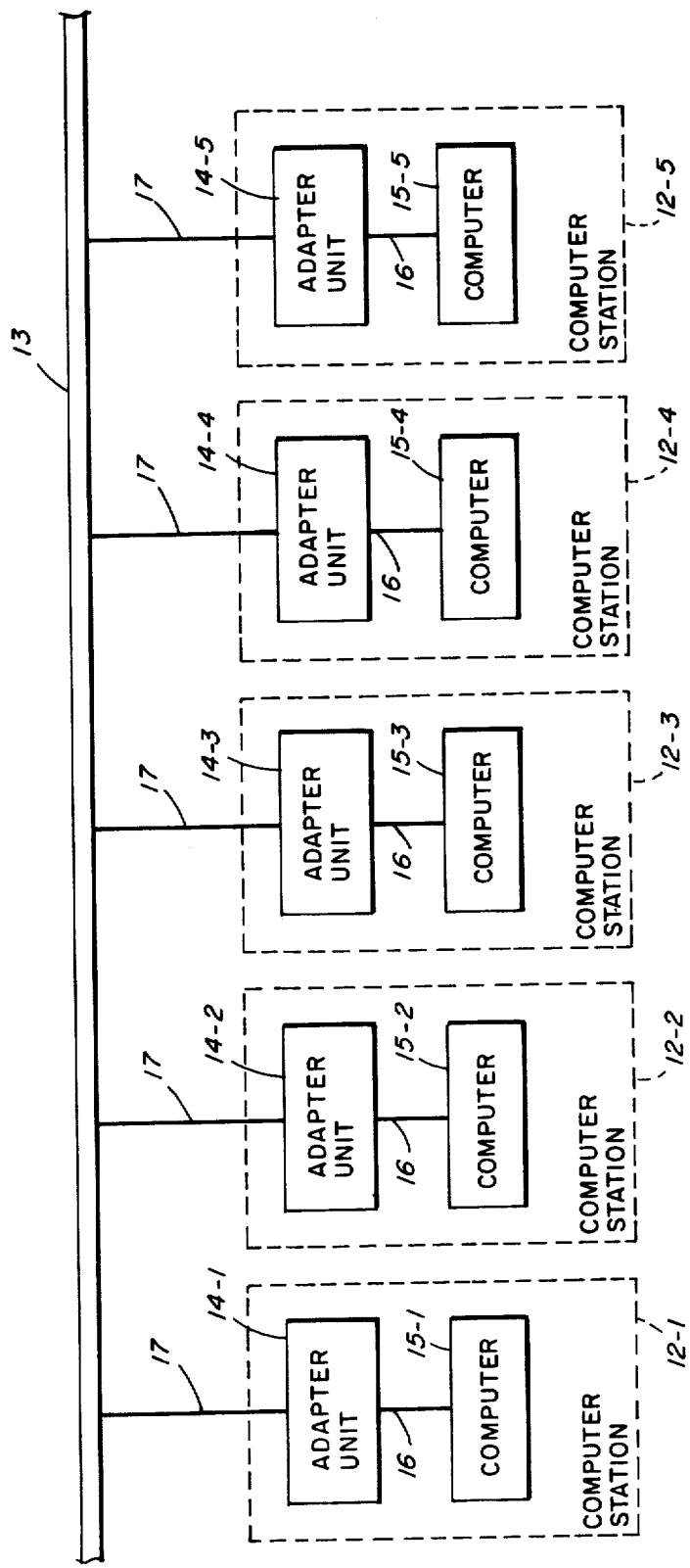
FIG. 1 is a block diagram of a computer network configured according to the teachings of this invention.

The present invention is directed to a computer network in which a plurality of geographically dispersed computer stations are interconnected by a single bi-directional bus used by the computer stations which is to transmit messages, control signals and status signals and wherein access to the bus is controlled by the computer stations themselves through an adapter unit located at each computer station. The adapter units collectively engage in a process by which one, and only one, member of the communicating group is dynamically selected to assume control over the bus. At all times, the absence of control over the bus triggers the selection of an adapter unit to assume control. The outcome of the selection process is 100% certain.

The computer network is both masterless and contentionless. The network is masterless in the sense that it does not involve the use of a central controller unit and is not dependent at any time on the operation of any one particular adapter unit for continuous operation. The network is contentionless in the sense that at no time will two or more adapter units access the bus simultaneously to send messages.

In addition to coordinating access to the bus, each adapter unit also serves as an interface between the bus and the computer located at its computer station.

The adapter units control access to the bus in the following manner.

Each adapter unit is assigned a unique number.

When the network is running normally, control of the bus is continually passed from one live adapter unit to another in numerical sequence; each adapter unit passing control to the adapter unit having the next highest assigned number and the adapter unit with the highest assigned number passing control to the adapter unit with the lowest assigned number. Polls are periodically taken by the live adapter units to determine which adapter units connected to the bus powered up and then to make changes, if needed, in the control passing arrangement. While an adapter unit is in control, it is either transmitting a message, sending out status or control signals over the bus. Thus, when the network is running normally the bus is continually active.

If, for any reason, there should be no activity on the bus for more than a predetermined time interval, all adapter units detecting this condition enter an election mode to decide amongst themselves which adapter unit should acquire control and resume activity. The absence of activity may be the result of a failure of an adapter unit while it is in control or may be the result of simply powering up the network either for the first time or after a total power failure. In the election, each participating adapter unit sends a pulse over the bus and then monitors the bus for a time period directly proportional to its unique member. If a participating adapter unit detects activity before the expiration of its particular monitoring period it has lost the election. If a non-participating adapter unit detects the pulse sent by any participating adapter unit before the expiration of the predetermined time interval it does not become a participant since it has not met the basic requirement for taking part in the election. The first participating adapter unit that does not detect activity during its particular monitoring period is the winner of the election and sends another pulse out over the bus which causes all remaining participating adapter units to detect activity before the expiration of their respective time periods and become losers in the election. As can be appreciated, the winner of the election is always the participating adapter unit having the smallest assigned number since that adapter unit will always monitor the bus for inactivity for the shortest period of time. As can be further appreciated, there is always only one winner since the second pulse causes all other participating adapter units to become losers.

After the adapter unit that has won the election assumes control over the bus it initiates a configuration cycle to determine the numerical order in which control is to be passed among the live adapter units.

As can be appreciated, the scheme is not dependent on the operation of any individual computer station or central controller unit and is not subject to collision situations.

Each adapter unit includes an address store for holding its unique assigned number, a next adapter unit register for holding the address of the live adapter unit having the next numerical number, a line activity indicator for monitoring the bus for activity, an timer for measuring time device for causing pulses to be emitted over the bus in the election procedure. Each adapter unit also includes a microcontroller for controlling the operations of the adapter unit and interface circuitry for processing data received from the bus into a form suitable for processing by its associated computer and for processing data received from it associated computer to a form suitable for transmission over the bus.

The basic rules of the protocol by which control is passed from one adapter unit to another are as follows:

1. Each adapter unit is assigned a different number.
2. Only an adapter unit designated by the network as having control of the bus can initiate a transmission.
3. After a transmission, the adapter unit in control passes control to the live adapter unit having the next highest number, or in the case of the adapter unit with the highest number to the adapter unit with the lowest number.
4. Polls are conducted periodically by the adapter units to accommodate adapter units leaving and coming on to the bus.
5. While an adapter unit is in control, it can establish a data link between itself and other adapter units if instructed by its computer to do so.
6. If activity ceases on the bus for a certain length of time, an election is held by the adapter units detecting this condition to select one and only one adapter unit to acquire control.

The particular period of time over which there must be inactivity over the bus to prompt an election is expressed by the formula:

$$T_1 \geq N \times \Delta$$

where:

$T_1$ = The time interval of inactivity:
$N$ = The maximum number of computer stations that can be handled by the bus;
$\Delta = 2\lambda$;
$\lambda = 1/v$;
$1$ = The largest distance between any two computer stations connected to the bus; and
$v$ = The propogation speed of electric waves over the bus.

Inactivity may be caused on the bus for any reason, such as initial power up, power up after a power failure or failure of a computer station while it is in control. Whatever the cause, whenever there is inactivity on the bus for a time interval $T_1$ (or greater), all adapter units recognizing this condition enter into an election mode.

In the election mode, each adapter unit that has measured inactivity for a time interval $T_1$, becomes a participant and sends a single pulse $P_1$ out over the bus. Any adapter unit detecting a pulse $P_1$ before its own time period $T_1$ has expired does not take part in the election since it has not observed inactivity for the necessary time interval. The width of pulse $P_1$ is made at least equal to $\lambda$ to insure that any pulses emitted by participants subsequent to the first participant will overlap the pulse emitted by the first participant.

For example, assume the largest distance between any two adapter units along the bus is one kilometer. Because of the propogation speed of electric waves over the bus, the time it takes a pulse to travel a one kilometer distance is 5 microseconds. Accordingly, if the pulse width of pulse $P_1$ is made equal to at least 5 microseconds then, the pulse $P_1$ transmitted over the bus by the first adapter unit that becomes a participant will at least partly overlap the pulse $P_1$ transmitted over the bus by any other adapter unit that subsequently (in time) becomes a participant. The pulses will overlap in the sense that the pulse $P_1$ transmitted by the first participating adapter unit will at least partly overlap the pulse $P_1$ of each other participating adapter unit whose pulse is transmitted subsequent in time to the pulse transmitted by the first adapter unit. The reason for the overlap is that the pulse sent out by the first adapter unit will reach every other adapter unit that is also sending out a pulse before the other pulses has been fully transmitted.

After sending a pulse $P_1$ out over the bus, each participating adapter unit monitors the bus for activity over a time interval $T_2$, where $T_2 = \Delta \times n$; and
$n$ = The assigned unique number of the particular adapter unit.

If an adapter unit detects activity before its particular monitoring period has expired, it has lost the election. The first adapter unit whose time period $T_2$ expires without detecting activity on the bus is the winner of the election and sends another pulse $P_2$ out over the bus. Pulse $P_2$ causes all remaining adapter units to detect activity before the expiration of their respective time periods $T_2$ and thus also become losers in the election. Thus, the adapter unit sending out the second pulse is the sole winner. As can be appreciated, the winner will always be the adapter unit having the lowest number N. The width of pulse $P_2$ is a matter of choice.

For example, if the maximum number of computer stations that can be connected to the bus is sixteen and, if, there are in fact five computer stations connected in the network, the assigned numbers of the logic units in the computer stations are 2,5,6,7 and 11, the distance between the furthest two of the sixteen computer stations is one kilometer and the propogation speed of electric waves over the bus is $2 \times 10^{10}$ cm/sec then:

$T_1 = 160$ microseconds;
$N = 16$;
$\lambda = 5$ microseconds;
$\Delta = 10$ microseconds;
$l = 100,000$ cm.;
$v = 2 \times 10^{10}$ cm/sec.;
$P_1 = 5$ microseconds; and
$T_2 = 20$ microseconds for adapter unit number 2;
$T_2 = 50$ microseconds for adapter unit number 5;
$T_2 = 60$ microseconds for adapter unit number 6;
$T_2 = 70$ microseconds for adapter unit number 7 and
$T_2 = 110$ microseconds for adapter unit number 11.

Referring now to FIG. 1, there is illustrated a computer network constructed according to the teachings of this invention and identified generally by reference numeral 11.

Computer network 11 includes a plurality of spatially dispersed computer stations 12 individually labeled 12-1, 12-2, 12-3, 12-4 and 12-5; the particular number of computer stations shown being for illustrative purposes only. Computer stations 12 are interconnected by a single transmission bus 13 which is electrically continuous and bi-directional. Bus 13 may be in the form, for example, of a coaxial cable or a twisted pair of wires or an optical link.

Each computer station includes an adapter unit 14 and a computer 15; the adapter units 14 being individually labeled 14-1, 14-2, 14-3, 14-4, and 14-5 and the computers 15 being individually labeled 15-1, 15-2, 15-3, 15-4 and 15-5. Each computer 15 is connected to its associated adapter unit 14 by a bus line 16 and each adapter unit is connected to bus 13 by a line 17.

Computers 15 may be intelligent display terminals, computer operated typewriters, computer operated storage devices or other types of intelligent data processing devices and may differ in form from station to station. The particular form of computer 15 at any station is a matter of choice. Each computer 15 is capable of operating as an independent data processing device. Each computer 15 is also capable of communicating with any one of the other computers 15 over bus 13. Adapter units 14 are functionally equal. Each adapter unit 14 serves as an interface between its associated computer 15 and bus 13. In addition, adapter units 14 collectively coordinate access to bus 13.

Figure 2:
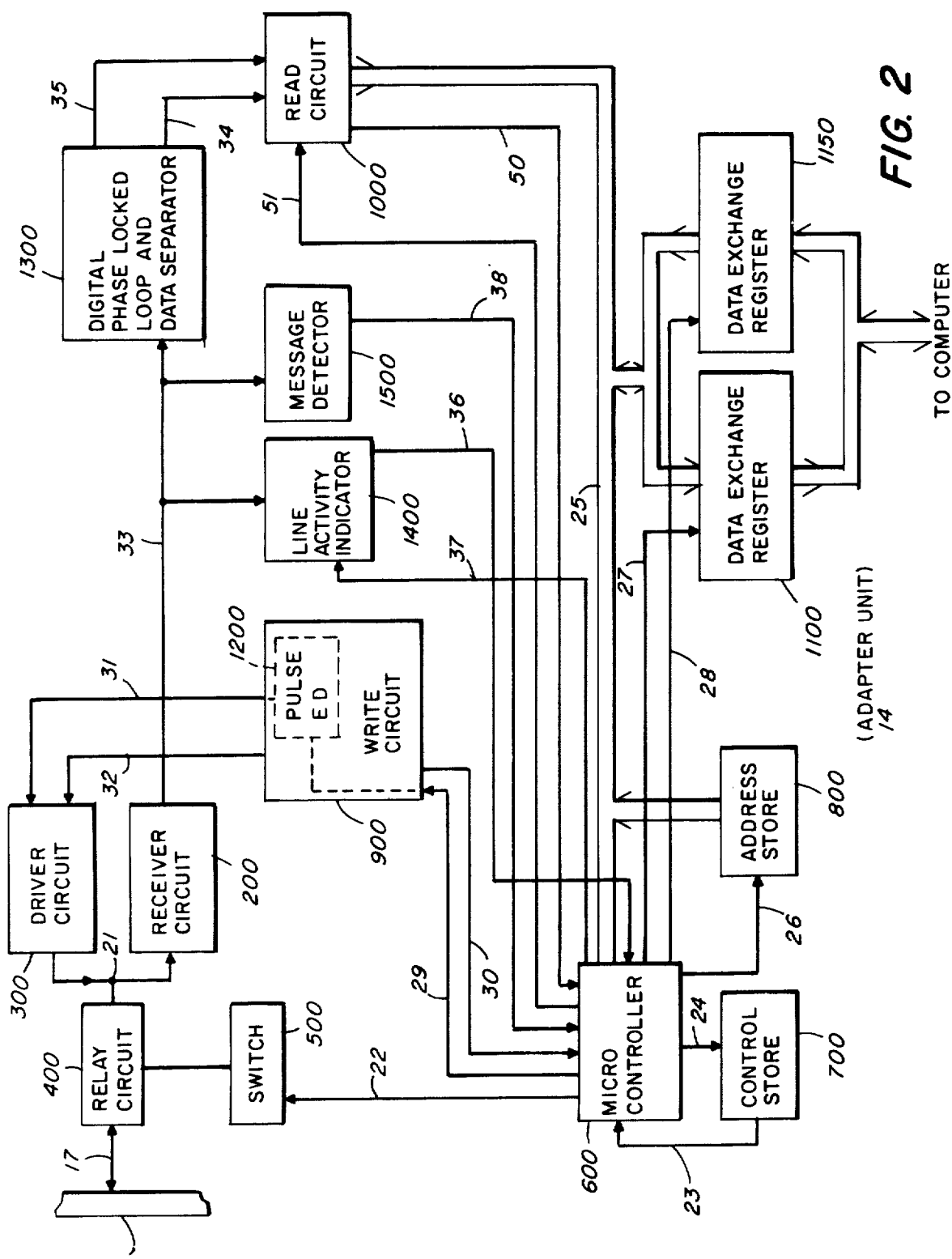
FIG. 2 is a block diagram of one of the adapter units in the computer network shown in FIG. 1.

Referring now to FIG. 2, there is illustrated in block diagram form the details of adapter unit 14.

There is a receiver circuit 200 for receiving incoming signals from bus 13 and a driver circuit 300 for transmitting outgoing signals to bus 13. Receiver circuit 200 translates the incoming analog signals from bus 13 to digital levels while driver circuit 300 converts the outgoing digital signals to analog levels. The input of receiver circuit 200 and the output of driver circuit 300 are connected to a junction 21 which is connected one side of a relay circuit 400. The other side of relay circuit 400 is connected to bus 13 by a line 17. When relay circuit 400 is open, receiver circuit 200 and driver circuit 300 are electrically disconnected from bus 13 and when relay circuit 400 is closed, receiver circuit 200 and driver circuit 300 are electrically coupled to bus 13. Relay circuit 400 is driven by a digital switch 500 whose state is controlled by signals received from a microcontroller 600 over a pair of lines 22. For clarity, the pair of lines 22 are illustrated as a single line.

Microcontroller 600 receives its instruction from a control store 700 which is connected to microcontroller 600 by a group of sixteen lines 23 and a group of ten lines 24. For clarity, both groups of lines 23 and 24 are illustrated as single lines. The functions performed by microcontroller 600 include generating control signals for certain of the other units within adapter unit 14, interpreting status or condition signals received from other units within adapter unit 14 and moving data signals between various units in adapter unit 14 and itself.

Microcontroller 600 is connected to an 8 bit bi-directional bus 25. Also connected to bus 25 are an address store 800, a write circuit 900, a read circuit 1000 and a pair of data exchange registers 1100 and 1150. Address store 800 contains the 8 bit number that is the unique assigned number of the particular adapter unit 14. This number is placed on bus 25 when address store 800 is instructed to do so by microcontroller 600 over a line 26. Data exchange registers 1100 and 1150 transfer data between bus 25 and computer 15 on signals sent from microcontroller 600 over lines 27 and 28, respectfully. Write circuits 900 receives parallel data from bus 25 and converts the data into serial form. Write circuit 900 is controlled by signals sent from microcontroller 600 over a group of four lines 29. For clarity, the group of four lines is illustrated as a single line. Status signals telling microcontroller 600 whether or not a byte is needed are sent to microcontroller 600 from write circuit 900 over a line 30. Read circuit 1000 converts serial data to parallel data, informs microcontroller 600 when a byte is available over a line 50, and deposits the parallel data onto bus 25 when instructed to do so by a signal from microcontroller 600 over a line 51.

The output of write circuit 900 is connected to the input of driver circuit 300 by a positive channel 31 and a negative channel 32. Write circuit 900 includes an element 1200 connected to positive channel 31 which is used in certain instances to generate a single pulse or signals received by microcontroller 600 over one of the lines 29.

The output of receiver circuit 200 is connected to the input of a digital phase locked loop and data separator 1300 by a line 33. Also connected to line 33 are a line activity indicator 1400 and a message detector 1500. Digital phase locked loop and data separator 1300 separates the data received from receiver circuit 200 into clock and data pulses and sends the separate signals to read circuit 1000 along individual lines 34 and 35. Line activity indicator 1400 monitors activity of line 33. Signals indicating the presence or absence of activity are sent to microcontroller 600 over line 36 and control signals for controlling line activity indicator 1400 are sent from microcontroller 600 over a line 37. Message detector 1500 detects the presence of a message (i.e. a multiplicity of transitions within a given time period) on line 33 and communicates this condition to microcontroller 600 over a line 38.

Thus, incoming signals from bus 13 which are in serial form and at analog levels are conditioned to digital levels by receiver circuit 211, separated into clock and data signals by the digital phase locked loop and data separator 1300, converted into parallel form by read circuits 1000 and then deposited on bus 25, while outgoing signals from bus 25 which are in parallel from and at digital levels are converted into serial form by write circuit 900, conditioned to analog levels by driver circuit 300 and then transmitted to bus 13.

Figure 3:
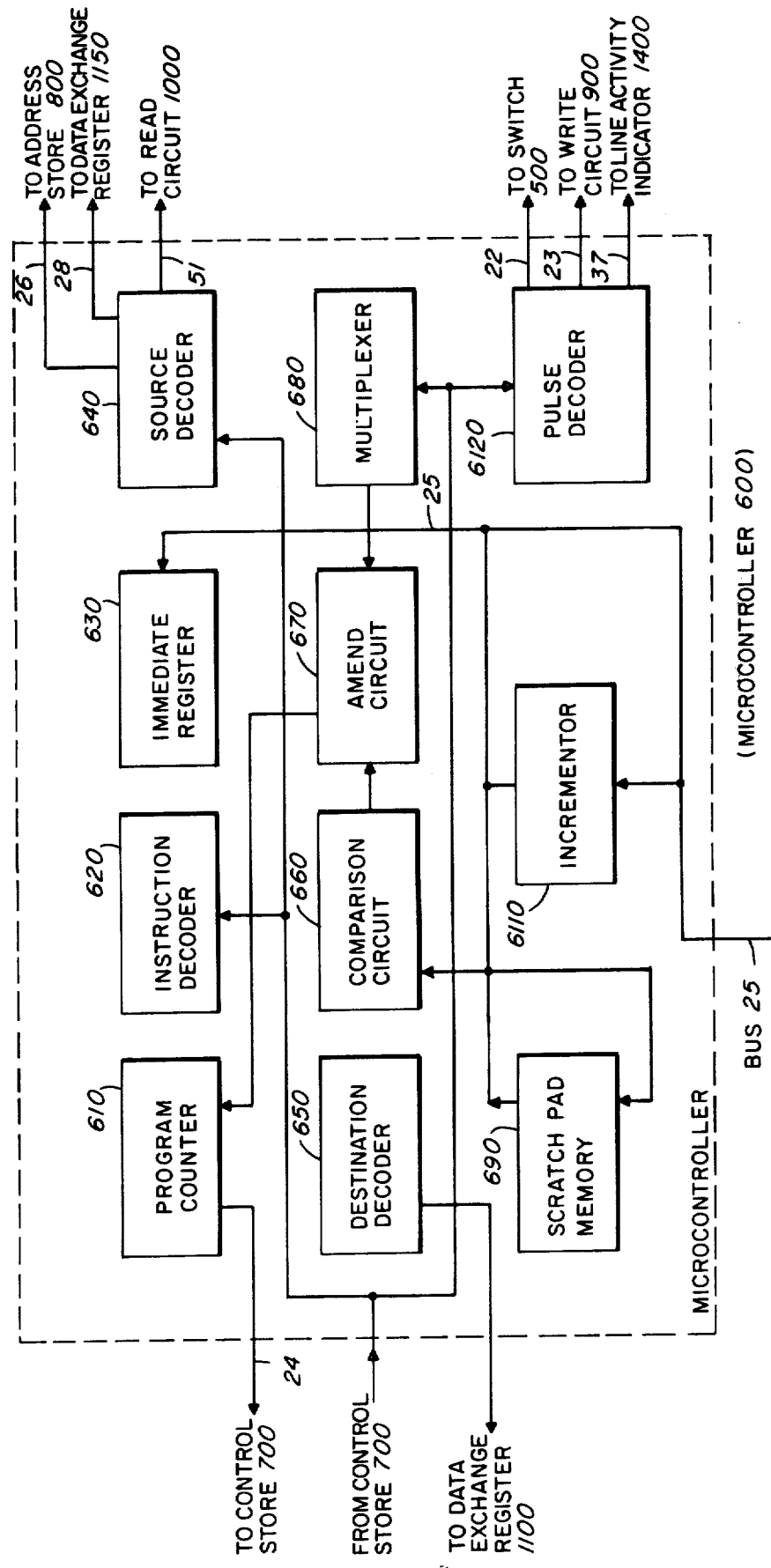
FIG. 3 is a block diagram of the microcontroller of the adapter unit shown in FIG. 2.

Referring now to FIG. 3, there is shown a block diagram of the microcontroller 600. As can be seen, microcontroller 600 includes a program counter 610, an instruction decoder 620, an immediate register 630, a source decoder 640, a destination decoder 650, a comparison circuit 660, an amend circuit 670, a multiplexer 680, a scratch pad memory 690, an incrementor 6110 and a pulse decoder 6120. The functions of these components and the manner in which these components are interconnected will be described in detail in conjunction with FIGS. 5A through 5L below.

The details of microcontroller 600 and control store 700 are shown in FIGS. 4 and 5A through 5L. In FIGS. 4 and 5A through 5L as well as the Figures illustrating the details other components in adapter unit 14, inputs appear generally on left-hand sides of components and outputs appear on right-hand sides of components and outputs appear on right-hand sides therefrom. Control lines generally appear at tops and bottoms of components. An output line labeled with a particular designation is intended to be interpreted as connected to an input line having the same designation. Each interconnection is not described verbially for clarity of purposes of illustration, and full meaning and understanding of the invention will be better achieved by referring to the drawings wherein the line labellings clearly show the connections.

Control store 700 includes four 1K×4 programimable read only memories 710, 720, 730, and 740. Each one of the memories may be a monolithic memories chip number 6353-1J.

Figure 5A:
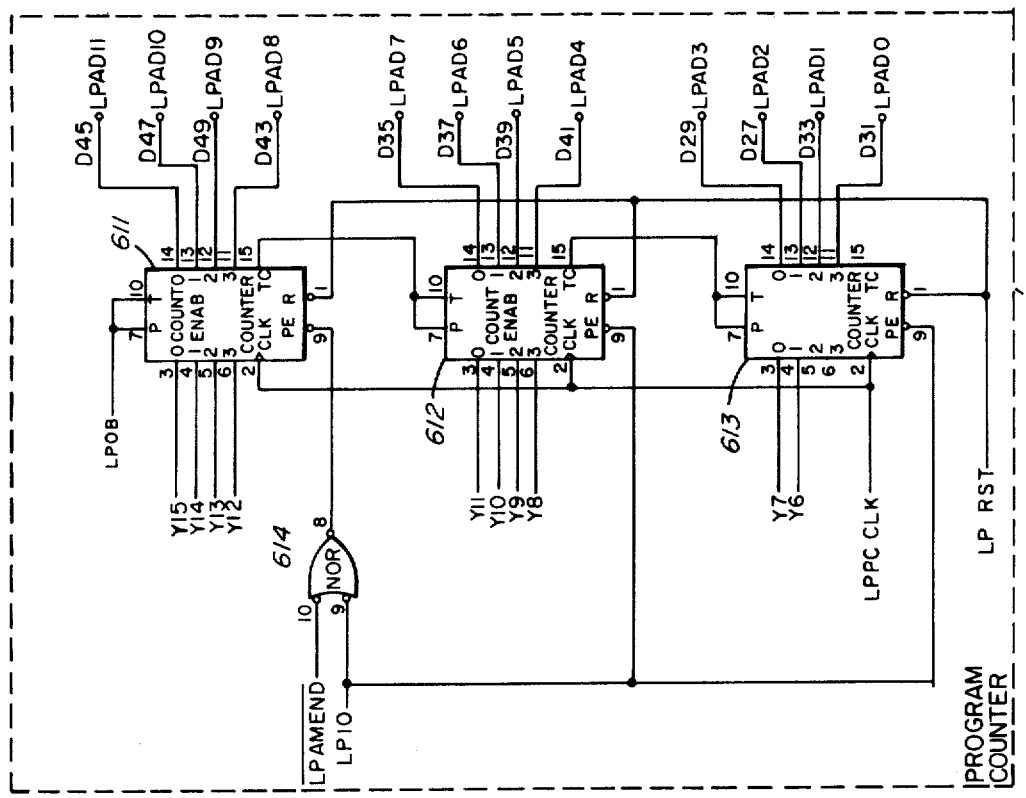
FIG. 5A is a schematic diagram of the program counter in the microcontroller shown in FIG. 3.
Figure 4:
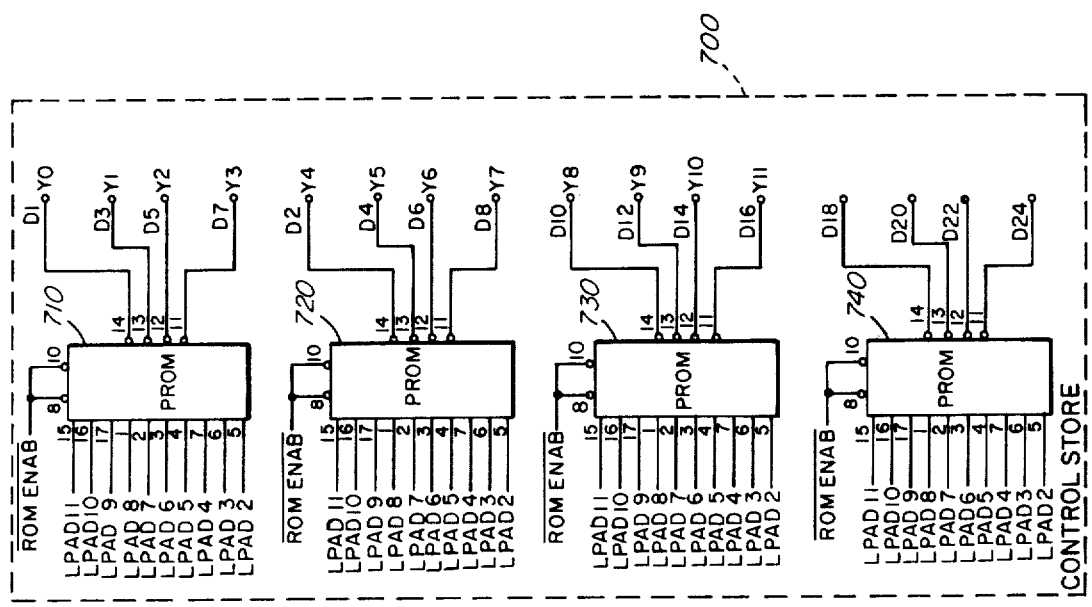
FIG. 4 is a schematic diagram of the control store shown in the adapter unit in FIG. 2.
Figure 5B:
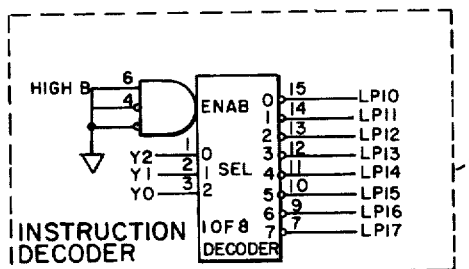
FIG. 5B is a schematic diagram of the instruction decoder in the microcontroller shown in FIG. 3.
Figure 5D:
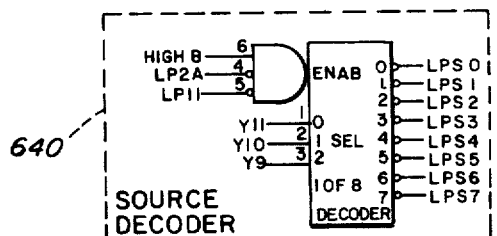
FIG. 5D is a schematic diagram of the source decoder in the microcontroller shown in FIG. 3.
Figure 5C:
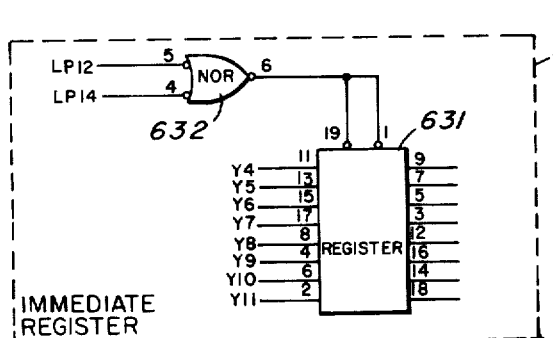
FIG. 5C is a schematic diagram of the immediate register in the microcontroller shown in FIG. 3.
Figure 5E:
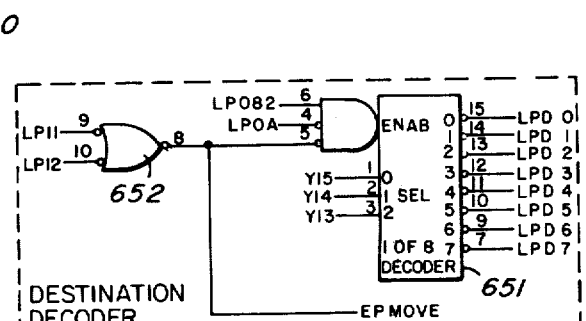
FIG. 5E is a schematic diagram of the destination decoder in the microcontroller shown in FIG. 3.
Figure 5F:
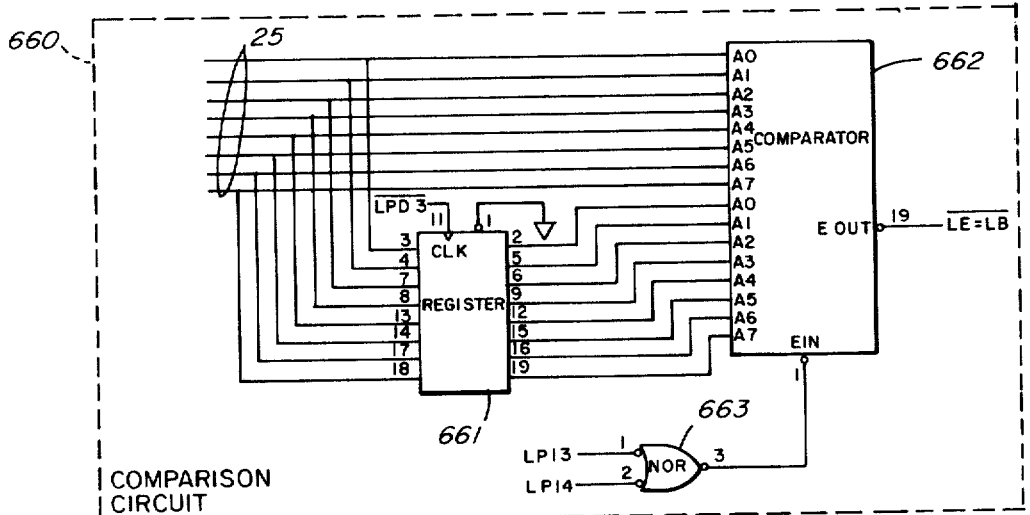
FIG. 5F is a schematic diagram of the comparison circuit in the microcontroller shown in FIG. 3.
Figure 5G:
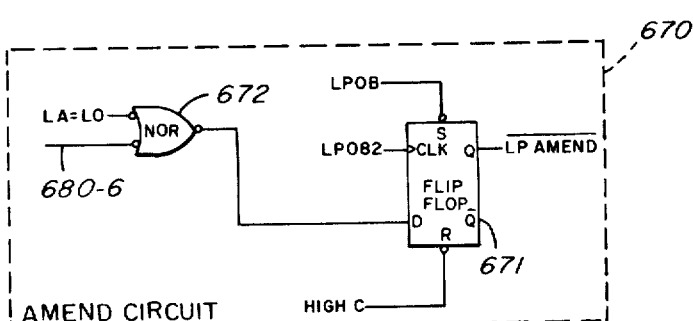
FIG. 5G is a schematic diagram of the amend circuit in the microcontroller shown in FIG. 3.
Figure 5H:
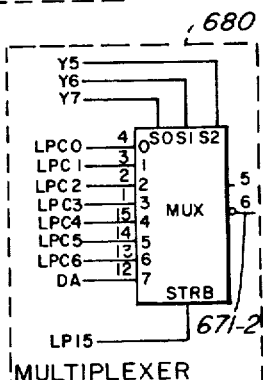
FIG. 5H is a diagram of the multiplexer in the microcontroller shown in FIG. 3.
Figure 5I:
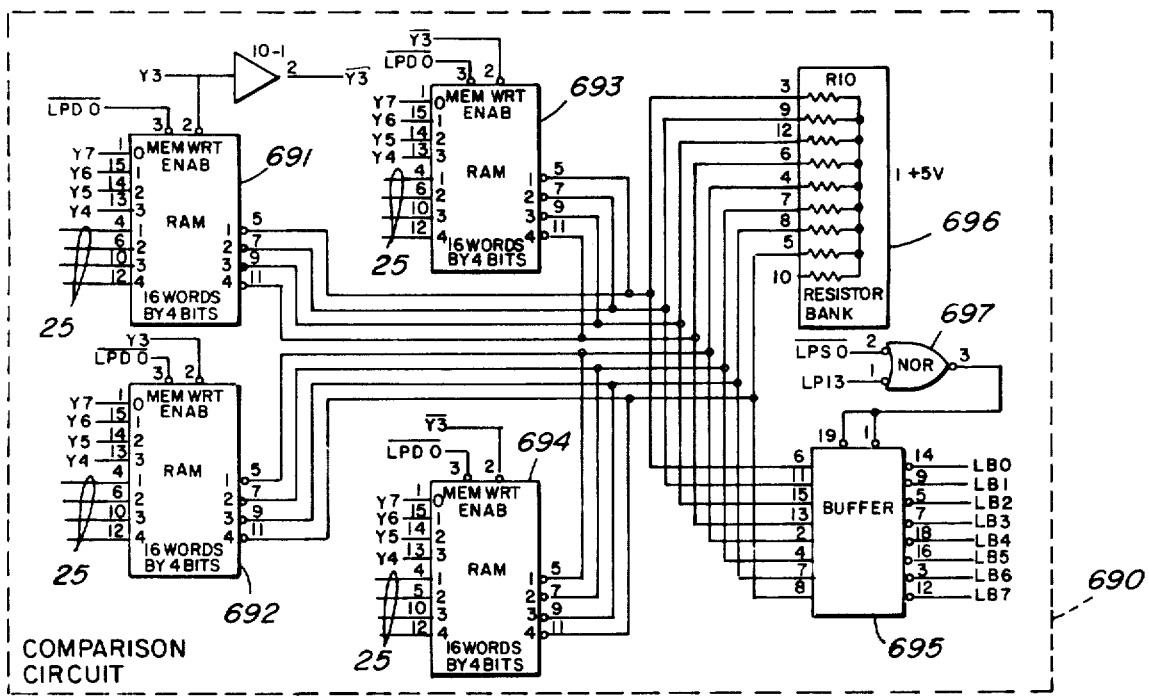
FIG. 5I is a schematic diagram of the scratch pad memory in the microcontroller shown in FIG. 3.
Figure 5J:
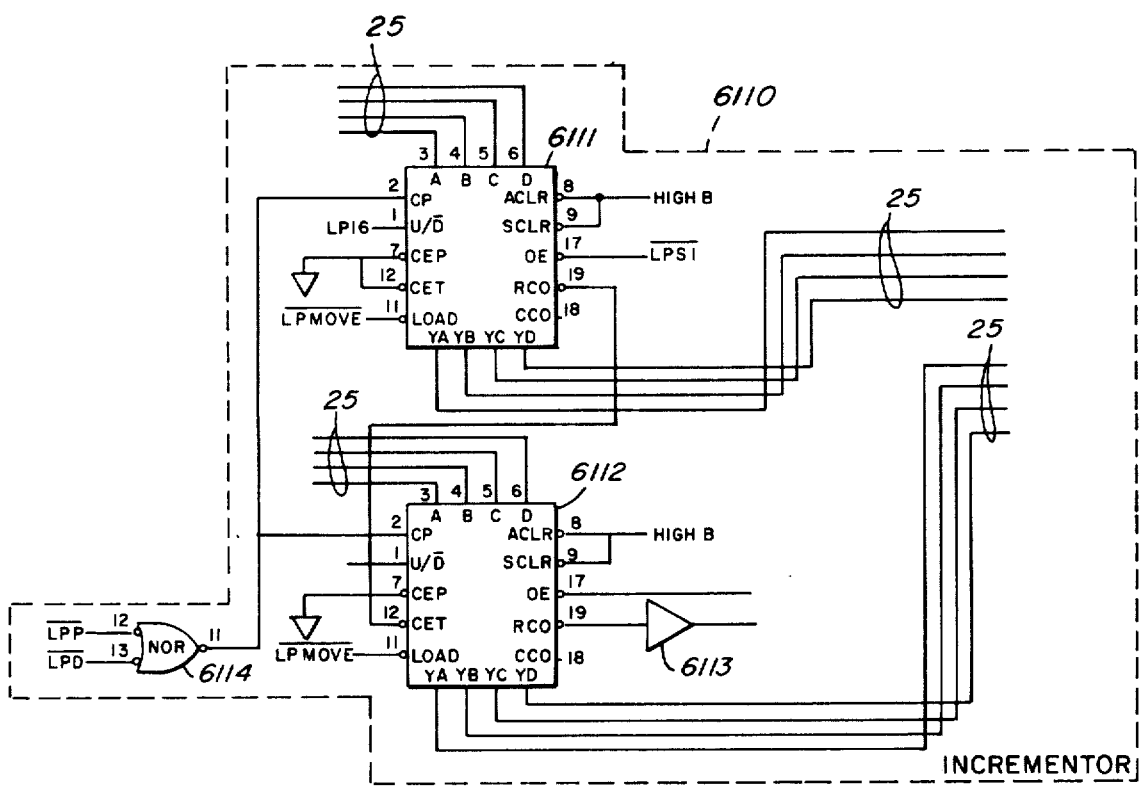
FIG. 5J is a schematic diagram of the incrementor in the microcontroller shown in FIG. 3.
Figure 5K:
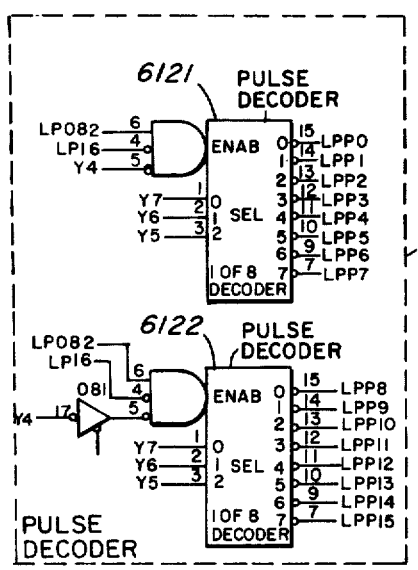
FIG. 5K is a schematic diagram of the pulse decoder in the microcontroller shown in FIG. 3.

Program counter 610, as can be seen in FIG. 5A, includes three program counter chips 611, 612, and 613 which are connected in series and a gate 614. Each one of the program counter chips may be a Texas Instrument chip number 74S163. The gate may be ¼ of Signetics chip number 74S08. Each chip contains 4 bits. Output lines LPAD2 through LPAD11 of program counters chips 611-613 are connected to each one of the PROMS 710, 720, 730 and 740. At all times program counter 610 is addressing PROMS 710, 720, 730, and 740. Thus, if program counter 610 reads a bit pattern of 200, then program counter chip 601 reads 0, program counter chip 602 reads 0 and program counter chip 603 reads 2. According to the executed instruction, the program counter reading may be incremented or totally or partially modified according to the logic levels present in the "Y" lines at the execution of the instruction. Lines Y0, Y1, Y2 also go to instruction decoder 620 (FIG. 5B) which decodes all the instructions from PROMS 710-740 and outputs these instructions over eight lines <LP0-IP7>. Instruction decoder 620 may be a Texas Instrument chip number 74S138. Four different catagories of instruction can be outputed from instruction decoder 620. They are the move instruction, the pulse instruction, the conditional jump instruction and the unconditional jump instruction.

Immediate register 630 includes a register 631, which may be a Motorola chip number 74LS244 and a gate 632, which may be ¼ of a Signetics chip number 74S08. As a part of the "move instruction", immediate register 630 (FIG. 5C) is used to place a data byte on bus 25 whose source is the program store 700 (lines Y4 to Y11).

Source decoder 640, (FIG. 5D) which may be a Texas Instrument chip number, 74S138, receives inputs from control store 700 over lines Y9 to Y11 and outputs over lines LPS$\phi$ through LPS7. If the decoded instruction is Move 1, source decoder 640 will decode the source field of the instruction and hold the selected source control line low. Each line $\overline{LPS0}$-$\overline{LPS7}$, causes a register that can output on bus 25 to output its contents. Destination decoder 650 (FIG. 5E) includes a chip 651 which may be a Texas Instrument chip number 74S138 and a gate, 652, which may be ¼ of a Signetics chip number 74S08. Estination decoder 650 receives inputs from control store 700 over lines Y13 and Y15 and outputs over lines LPD0 through LPD7. If the decoded operation is MOVE destination decoder 650 decodes the Destination Field of the instruction and outputs a pulse on the appropriate destination control line.

Comparison circuit 660 (FIG. 5F) includes a register 661 an 8-bit comparator 662 and a gate 663. Register 661 may be a Signetics chip number 74LS374; comparator 662 may be an American Mico Devices chip number 25LS2521; and gate 663 may be ¼ of a Signetics chip number 74S08. Comparator 662 compares a byte previously moved to register 661 to the byte appearing on bus 25 at the time of executing a conditional jump instruction. The output Eo of comparator 662 is LA=LB. If the bytes compared are equal, the output Eo is low. If the bytes compared are not equal, LA=LB is high. The output Eo of comparator 662 is fed into amend circuit 670 through the 8 to 1 multiplexer 680.

Amend circuit 670 (FIG. 5G) is made up of a flip-flop 671 and an OR gate 672. Flip-flop 671 may be a Texas Instrument chip number 74S74 and gate 672 may be ¼ of a Signetics chip number 74S08. Multiplexer 680 maybe a Texas Instrument chip number 74LS151. Multiplexer 680 (FIG. 5H) receives inputs from lines LPC0, LPC1, LPC2, $\overline{LPC3}$, $\overline{LPC4}$, $\overline{LPC5}$, LPC6 and $O_A$ and selects which signal is to appear on the output at pin 6 by the addresses coming in at pins S0, or S1 and S2 over lines Y5, Y6 and Y7 from control store 700. By this manner the conditions are tested. Then, if a particular condition is met, the output of amend circuit 670 ($\overline{LPAMEND}$) goes low causing program counter 611 to amend its value in conjunction with the Y12-Y15 values. If the tested condition is not met, program counter 611 will increment in the regular fashion.

Scratch pad memory 690 (FIG. 5I) carries the adapter state information, the next adapter unit register number and all information pertaining to the send and receive functions. Scratch pad memory 690 includes four random access memories (RAMS) 691, 692, 693 and 694, a buffer 695, a pull-up resistor bank 696 and a gate 697. Each RAM may be an Amercian Micro Devices chip number AM3101A, buffer 695 may be a Motorola chip number 74LS240 and gate 697 may be a ¼ of Texas Instrument chip number 74LS08. Each RAM is organized as 16 words by 4 bits. Thus, collectively, the RAMS provide 32 bytes of scratch pad memory. Buffer 695 is used to place the contents of the addressed RAM location onto bus 25 at the time of executing the MOVE instruction and is enabled and disabled by gate 697.

Incrementer 6110 (FIG. 5J) includes two tri-state up/down counters 6111 and 6112, an inventer 6113 and an OR gate 6114. The up/down counters 6111 and 6112 may each be an Amercian Micro Devices chip number AM25LS2569, inverter 6113 may be ¼ of a Motorola chip number 74LS240 and OR gate 6114 may be ¼ of a Signetics chip number 74S08.

Microcontroller 600 can (1) increment the contents of counter 6111 and 6112, (2) test for the contents to equal 0, and (3) deposit a byte into counters 6111 and 6112.

Thus, incrementer 6110 is the mechanism by which microcontroller 600 can count events or time. Using incrementer 6110, microcontroller 600 can count events such as a number of bytes transmitted or received or count time such as a time period of inactivity over line 33 to determine if an election should be conducted, or the nΔ time period used while adapter unit 14 is in the election mode.

Pulse decoder unit 6120 (FIG. 5K) includes two pulse decoder 6121 and 6122. Each pulse decoder 6121 and 6122 may be a Texas Instrument chip number 74S138. One of the pulse decoders 6121 output pulses over lines LPP∅ through LPP7 while the other pulse decoder 6122 outputs pulses over lines LPP8 through LPP15. If the decoded instruction is a pulse, pulse decoder unit 6120 decodes the pulse field of the instruction and outputs a pulse on the appropriate line (LPP∅–LPP15).

Figure 6:
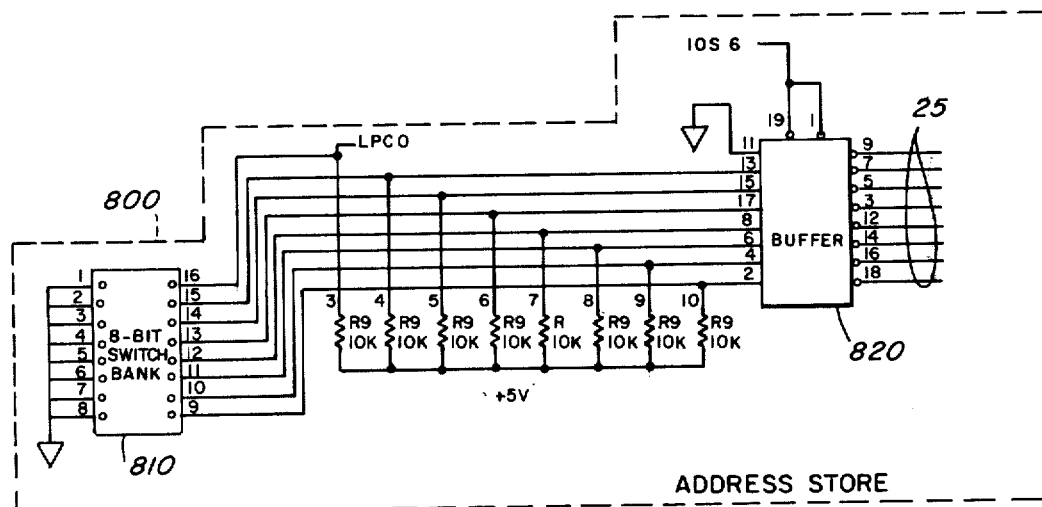
FIG. 6 is a schematic diagram of the address store in the adapter unit in FIG. 2.

Referring now to FIG. 6, address store 800 includes an 8 bit switch bank 810 and a buffer 820. Switch bank 810 contains the 8 bit number that is the physical address of the particular adapter unit 14. Buffer 820 places that number on bus 25 when instructed to do so.

Figure 7:
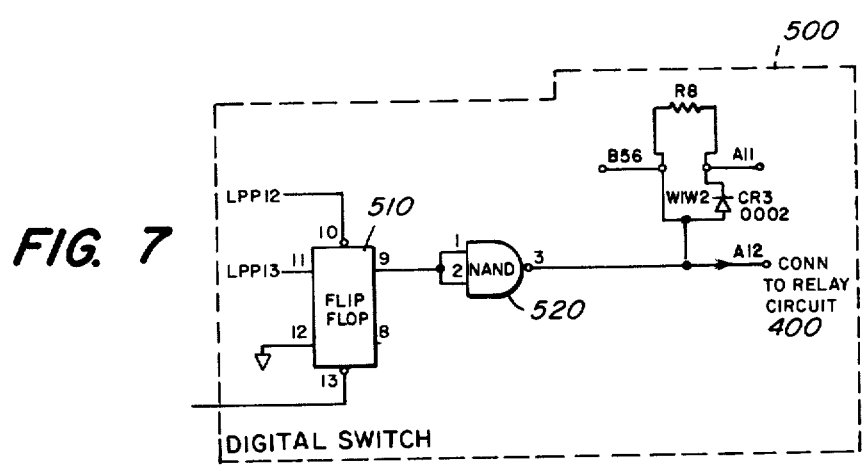
FIG. 7 is a schematic diagram of the digital switch in the adapter unit in FIG. 2.

Referring now to FIG. 7, digital switch 500 includes a flip-flop 510, a buffer 520 and a termination resisitor circuit 530. Flip-flop 510 may be ½ of a Texas Instrument chip number 74LS74 and buffer 520 may be ½ of a Texas Instrument chip number 75452. Digital switch 500 controls relay circuit 400. Using the pulse instructions, microcontroller 600 turns the relay in relay circuit 400 on via line $\overline{\text{LPP12}}$ and OFF via line $\overline{\text{LPP13}}$.

Figure 8:
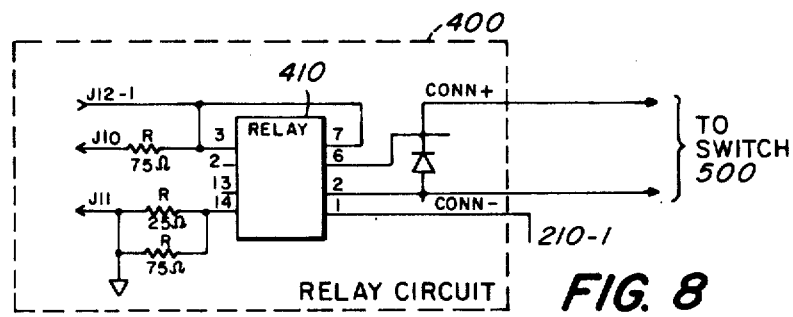
FIG. 8 is a schematic diagram of the relay circuit in the adapter unit in FIG. 2.

Referring now to FIG. 8, relay circuit 400 includes a relay 410. The inputs of relay 410 are connected to CONN+ and CONN−, which are the outputs of digital switch 500. The normally open contacts (terminals 7 and 9) of relay 410 are connected to bus 13.

Figure 9:
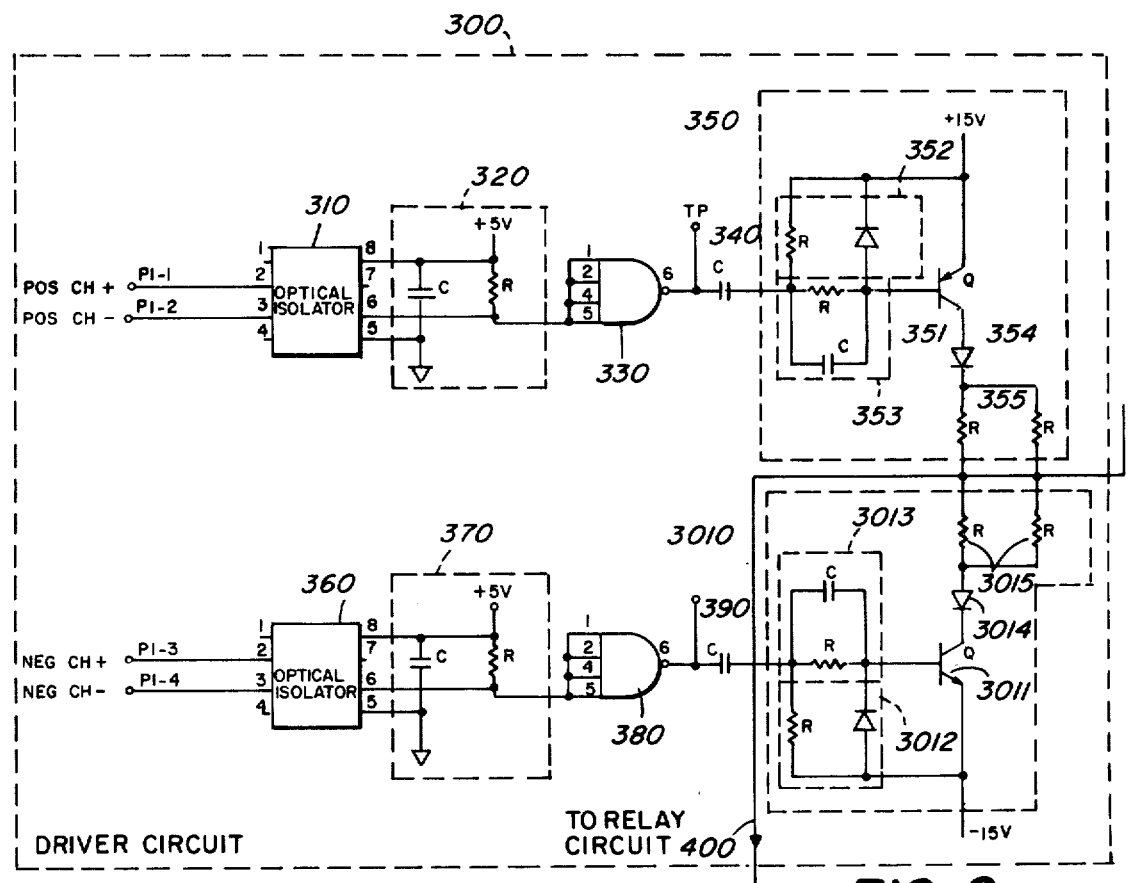
FIG. 9 is a schematic diagram of the driver circuit in the adapter unit in FIG. 2.

Referring now to FIG. 9, driver circuit 300 includes two sections, one for processing signals received from write circuit 900 over positive channel 31 and the other for processing signals received from write circuit 900 over negative channel 32. The section for processing signals received from positive channel 31 includes an optical isolator 310 for ground isolation, a pull-up resistor and bi-pass capacitor 320, a buffer 330, a dc blocking capacitor 340 and a driver transistor circuit 350. The driver transistor circuit 350 includes a transistor 351, emitter components 352, base components 353, a diode 354 and a pair of parallel resistors 355. Similarly, the section for processing signals received from negative channel 2 includes an optical isolator 360, a pull-up resistor and bipass capacitor 370, a buffer 380, a dc blocking capacitor 390 and a driver transistor circuit 3010 having a transistor 3011, emitter components 3012, base components 3013, a diode 3014 and a pair of parallel resistors 3015. In transistor circuits 350 and 3010, the signals are boosted to levels compatable for transmission over bus 13 and sent to bus 13 over line 17.

Figure 10:
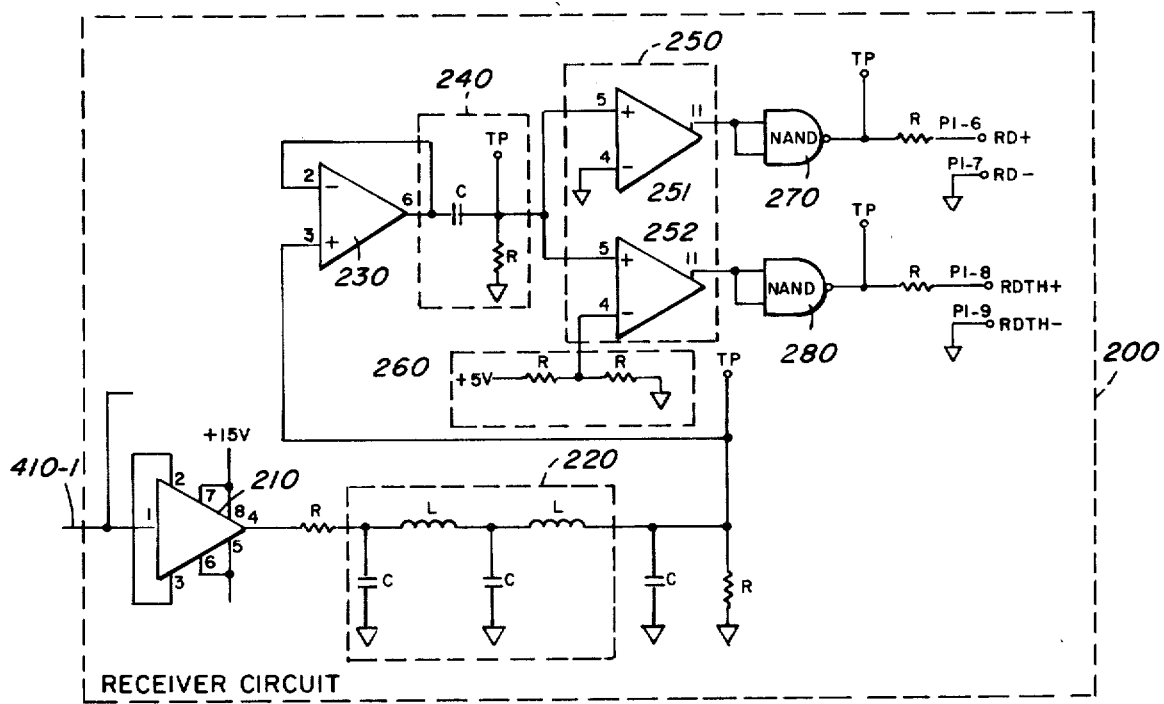
FIG. 10 is a schematic diagram of the receiver circuit in the adapter unit in FIG. 2.

Referring now to FIG. 10, receiver circuit 200 include an input operational amplifier 210 whose output is passed through a low pass filter circuit 220. The output of low pass filter circuit 220 is fed into another operational amplifier 230 and from there to a differentiator circuit 240 which counteracts the signal distortion occurring over bus 13. The output from the differentiator circuit 240 is fed into a comparator section 250 which includes two comparators 251 and 252. One comparator 251 compares the input to ground while the other comparator 252 compares the input to a small level above ground through a threshold circuit 260. The output from comparators 251 and 252 are fed into buffers 270 and 280 respectively. The output of buffer 270 is sent out on line 33 to the digital phase locked loop and data separator 1300 while the output of buffer 280 is sent to line activity indicator 1400 message detector 1500. Thus, the two outputs are produced, one for processing and the other to crudely detect the presence of useable signals on the line.

Figure 11:
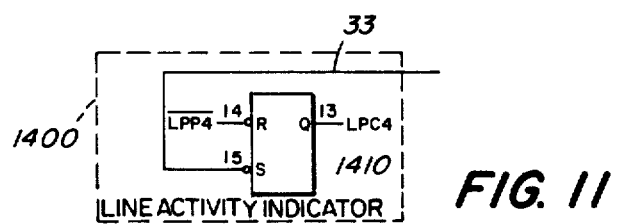
FIG. 11 is a schematic diagram of the line activity indicator in the adapter unit in FIG. 2.

Referring now to FIG. 11, line activity indicator 1400 comprises a flip-flop 1410 which may be ½ of a Texas Instrument chip number 74279. Flip-flop 1410 has an input S which is connected to Line 33 an input R connected to pulse decoder unit 6120 over line LPP4 and an output Q connected to 8 to 1 multiplexer 680 over line LPC4.

Microcontroller 600 resets flip-flop 1410 and then monitors the Q output for activity over line 33. So long as there is no activity, the set input S remains high and flip-flop 1410 remains reset. If the set input S goes low for any period of time, flip-flop 1410 sets and the Q output goes high signalling microcontroller 600 that activity has occurred on bus 13 (that is, over line 33). Flip-flop 1410 remains set until microcontroller 600 resets it by pulsing the reset input R.

Figure 12:
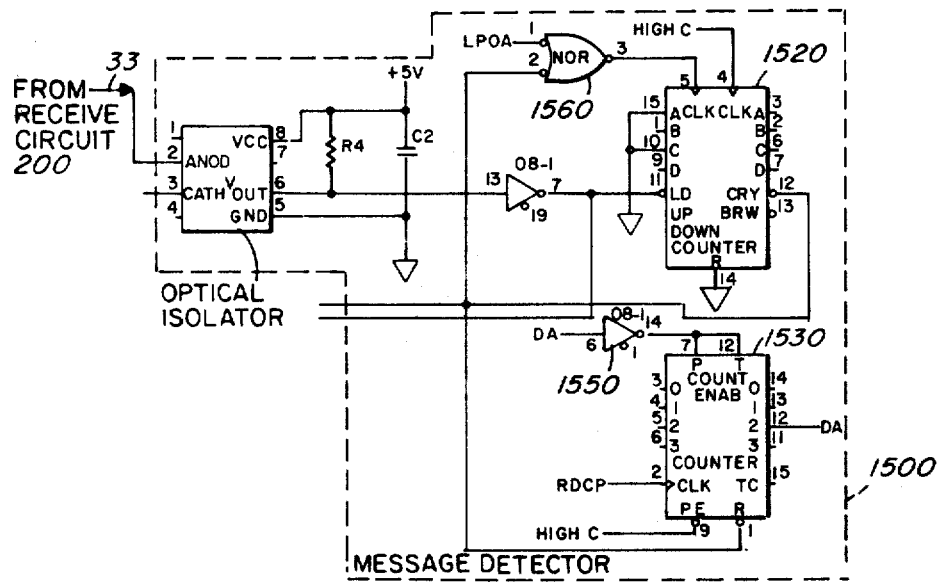
FIG. 12 is a schematic diagram of the message detector in the adapter unit in FIG. 2.

Referring now to FIG. 12, message detector 1500 includes an optical isolator 1510 for ground isolation, a 4 bit binary counter 1520 to detect if the line 33 is pulsing, a 4 bit binary counter 1530 to count four transitions before the signal goes high signifying that data is arriving, a pair of inverters 1540 and 1550 and a negative OR gate 1560. Optical isolator 1510 may be a Hewlitt Packard chip number HPCL-2602, counter 1520 may be a Signetics chip number 74LS193, counter 1530 may be a Texas Instrument chip number 74LS161, inverters 1530 and 1540 may each be ½ of a Motorola chip number 74LS240 and OR gate 1560 may be ¼ of a Signetics chip number 74S08.

Figure 13:
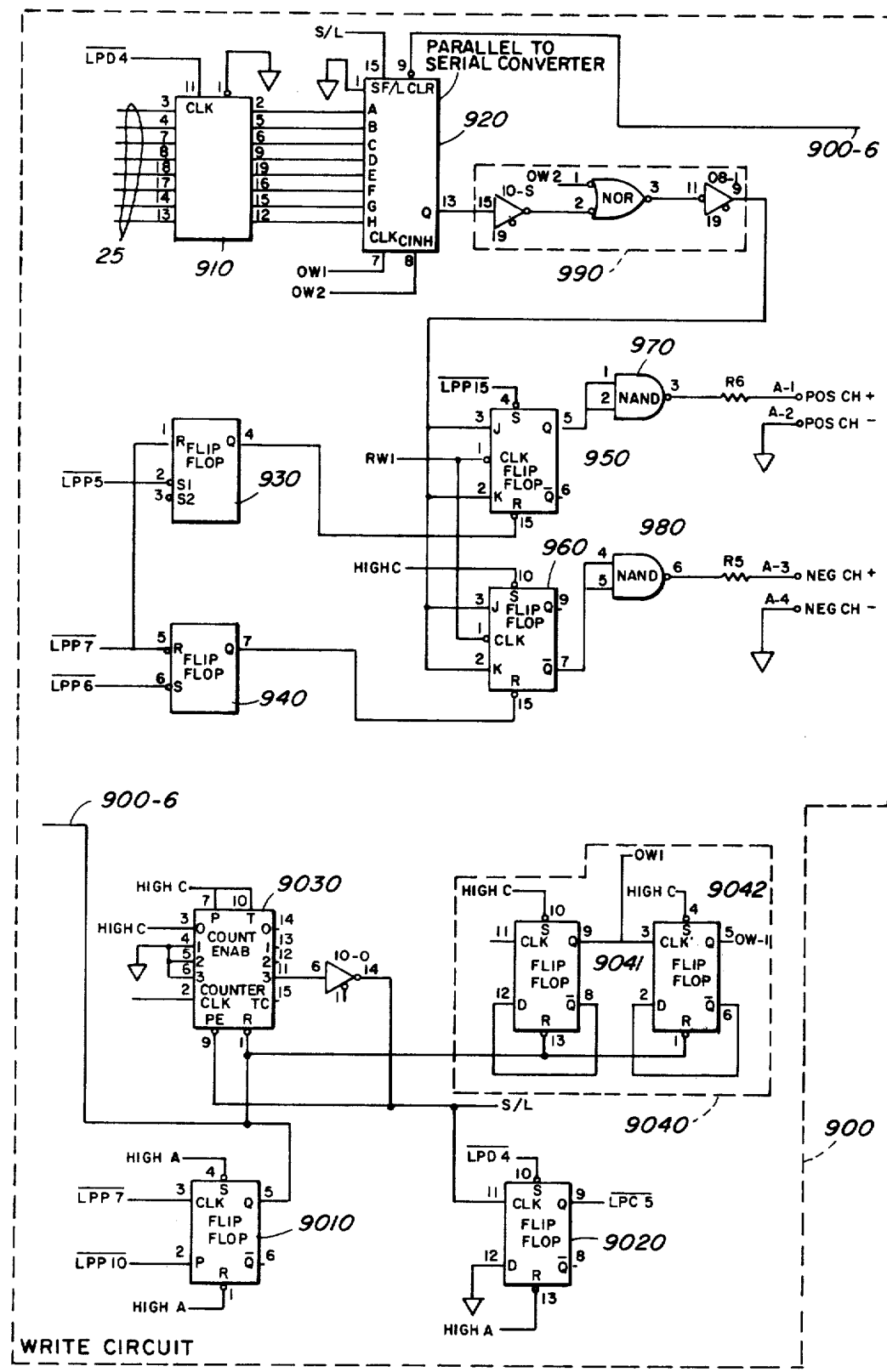
FIG. 13 is a schematic diagram of the write circuit in the adapter unit in FIG. 2.

Referring now to FIG. 13, write circuits 900 includes a holding register 910, a parallel to serial converter 920, a pair of flip-flops 930 and 940, a pair of output flip-flops 950 and 960, a pair of buffer gates 970 and 980, a series of gates 990, a pair of flip-flops 9010 and 9020, a counter 9030 and a timer 9040. Timer 9040 includes a pair of flip-flops 9041 and 9042. Holding register 910 may be a Signetics chip number 74LS374, parallel to serial converter 920 may be a Texas Instrument chip number 74166, each one of the flip-flops 930 and 940 may be ¼ of a Texas Instrument chip number 74279 and flip-flops 950 and 960 may each be ½ of a Signetics chip number 74LS112. Each one of the buffers 970 and 980 may be ¼ of a Signetics chip number 74S37, the series of gates 990 may be ¼ of a Motorola chip number 74LS240, flip-flop 9010 and 9020 may each be ½ of a Texas Instrument chip number 74LS161 and flip-flops 9041 and 9042 may each be ½ of a Texas Instrument chip number 74LS74. Data is received from bus 25 by holding register 910 and then shifted in parallel to the parallel to serial converter 920 where it is converted to serial form. The output from parallel to serial converter 920 is sent to flip-flops 950 and 960 through gate circuit 990. The outputs of flip-flops 950 and 960 are sent through buffer gates 970 and 980, respectively. The output from buffer gate 980 is coupled to positive channel and the output from buffer gate 930 being coupled to negative channel 32. Flip-flops 950 and 960 also receive input from flip-flops 930 and 940 respectively which receive signals from microcontroller 600 over lines $\overline{\text{LPP5}}$, $\overline{\text{LPP6}}$ and LPP7. Counter 9030 counts the number of bits serialized out.

Flip-flops 930 and 950 also function as a single emitting device 1200; that is, in one mode they are used as part of write circuits 900 and in another mode they are used to pulse positive channel line 23. A pulse is produced by sending a signal to pin S of flip-flop 950 over line $\overline{\text{LPP15}}$ causing the output Q at pin 5 of flip-flop 950 to go high and then sending a signal to input R of flip-flop 950 a period of time later causing the output Q to go low. The period of time (i.e. the pulse width) is controlled by controller 600.

Figure 14:
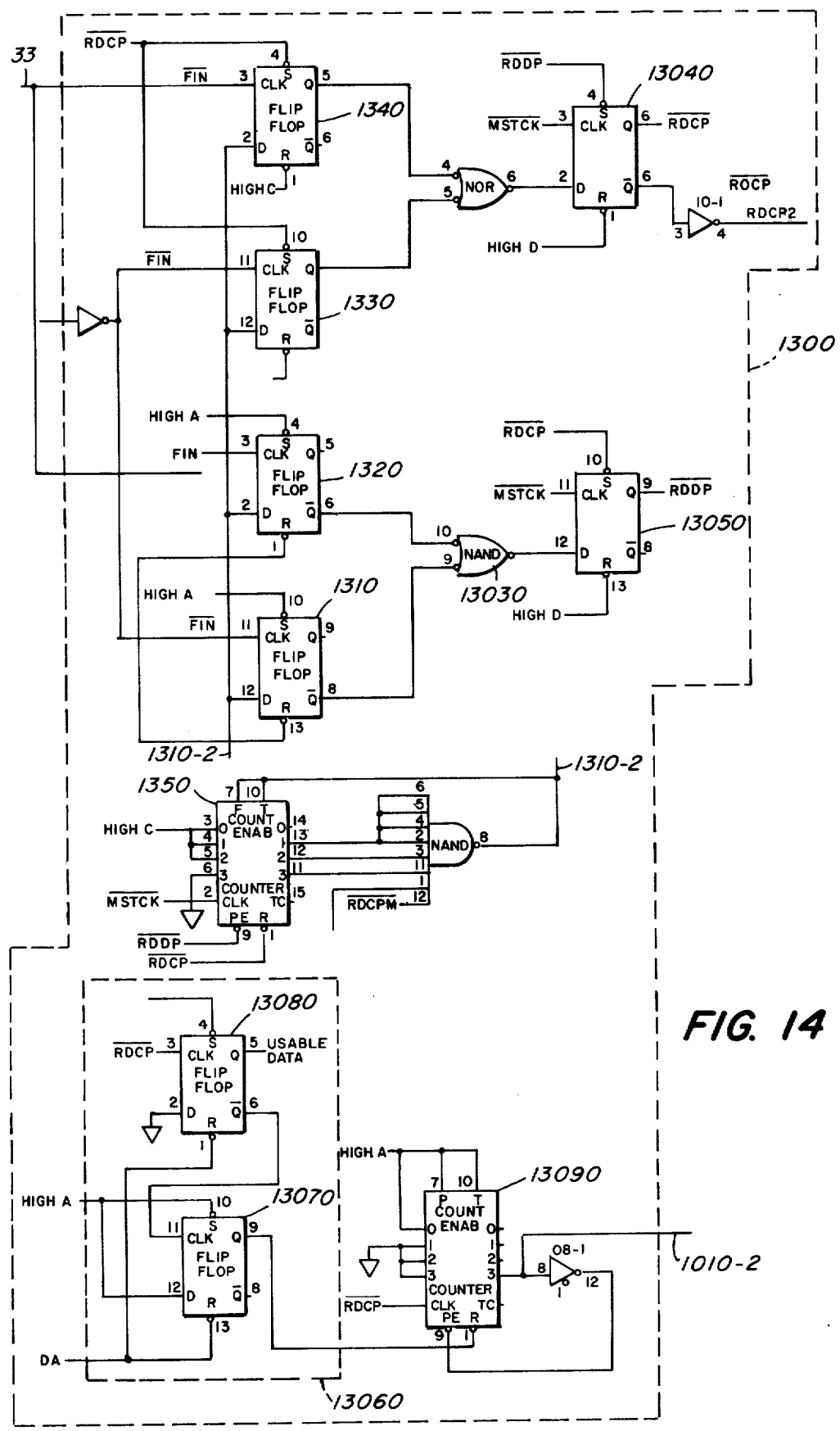
FIG. 14 is a schematic diagram of the digital phase locked loop and data separator in the adapter unit in FIG. 2.

Referring now to FIG. 14, digital phase locked loop and data separator 1300 includes four flip-flops 1310, 1320, 1330, and 1340 which detect the occurance of any transitions on the Fin or $\overline{\text{Fin}}$ lines. Fin and $\overline{\text{Fin}}$ are the digitized version of what appears on the network bus 13. Since a double frequency modulation scheme is employed, there is always a transition occurring at the beginning of each bit cell plus another transition in the middle of the bit cell, if the bit cell is a ONE bit. Flip-flops 1310, 1320, 1330 and 1340 also receive inputs on their data inputs from counter 1350 and state "7" decoding AND gate 1360. Counter 1350 is preset to zero each time a transition occurs corresponding to a bit cell boundary (READ DATA CLOCK PULSE, RDCP). With such an arrangement, one of the flip-flop pairs 1310 and 1320 will change state on every clock transition and one of the 1330, 1340 pair will change state on every data transition. The output of each flop pair is "ORED" by gates 13020 or 13030 and presented as input to flip-flops 13040 and 13050. The output of flip-flop 13040 is the clock pulse (RDCP) and the output of flip-flop 13050 is the data pulse (RDDP). Phase lock loop and data separator 1300 also includes a synch stripper 13060 which strips out the synch bit and which is made up of two flip-flops 13070 and 13080. The output of synch stripper 13060 is fed through a counter 13090 which counts the number of the received serialized bits.

Each one of the flip-flops 1310, 1320, 1330 and 1340 may be ½ of a Texas Instrument chip number 74S74, counter 1350 may be a Texas Instrument chip number 74S163, gate 1360 may be a National Semiconductor chip number 74S30 and each one of the "OR" gates may be ½ of a Signetics chip number 74S08. Flip-flops 13040 and 13050 may be each be ½ of a Texas Instrument chip number 74S74, flip-flops 13070 and 13080 may each be ½ of a Texas Instrument chip number 74LS74 and counter 13090 may be an American Micro Device Chip number 74LS161.

Figure 15:
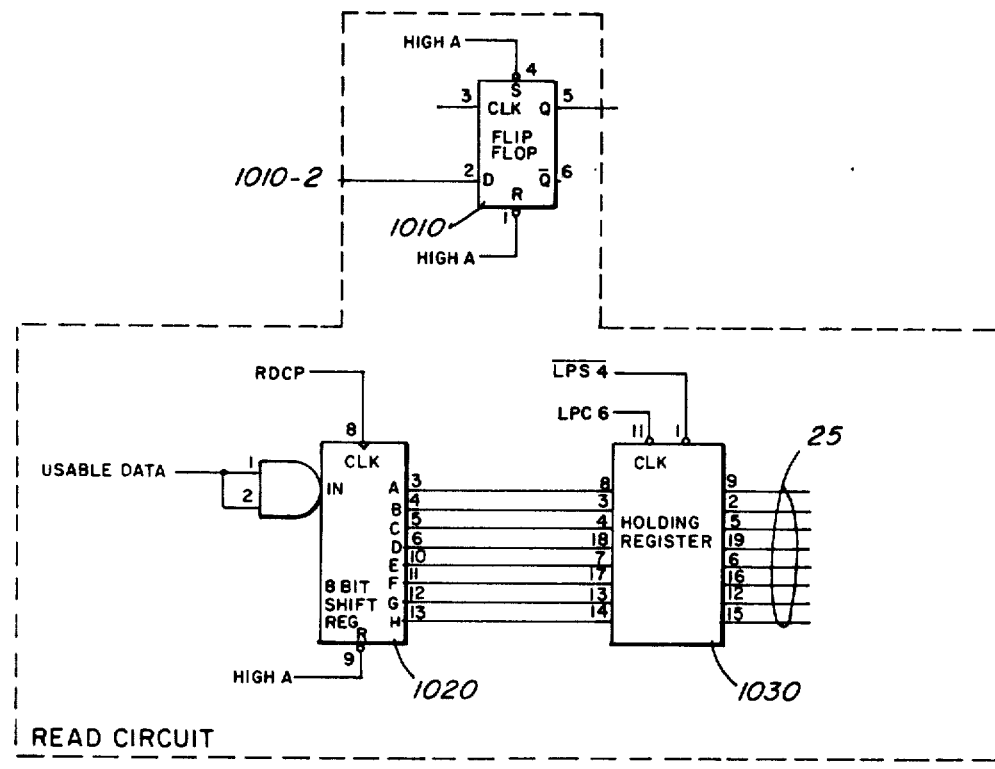
FIG. 15 is a schematic diagram of the read circuit in the adapter unit in FIG. 2.
Figure 16:
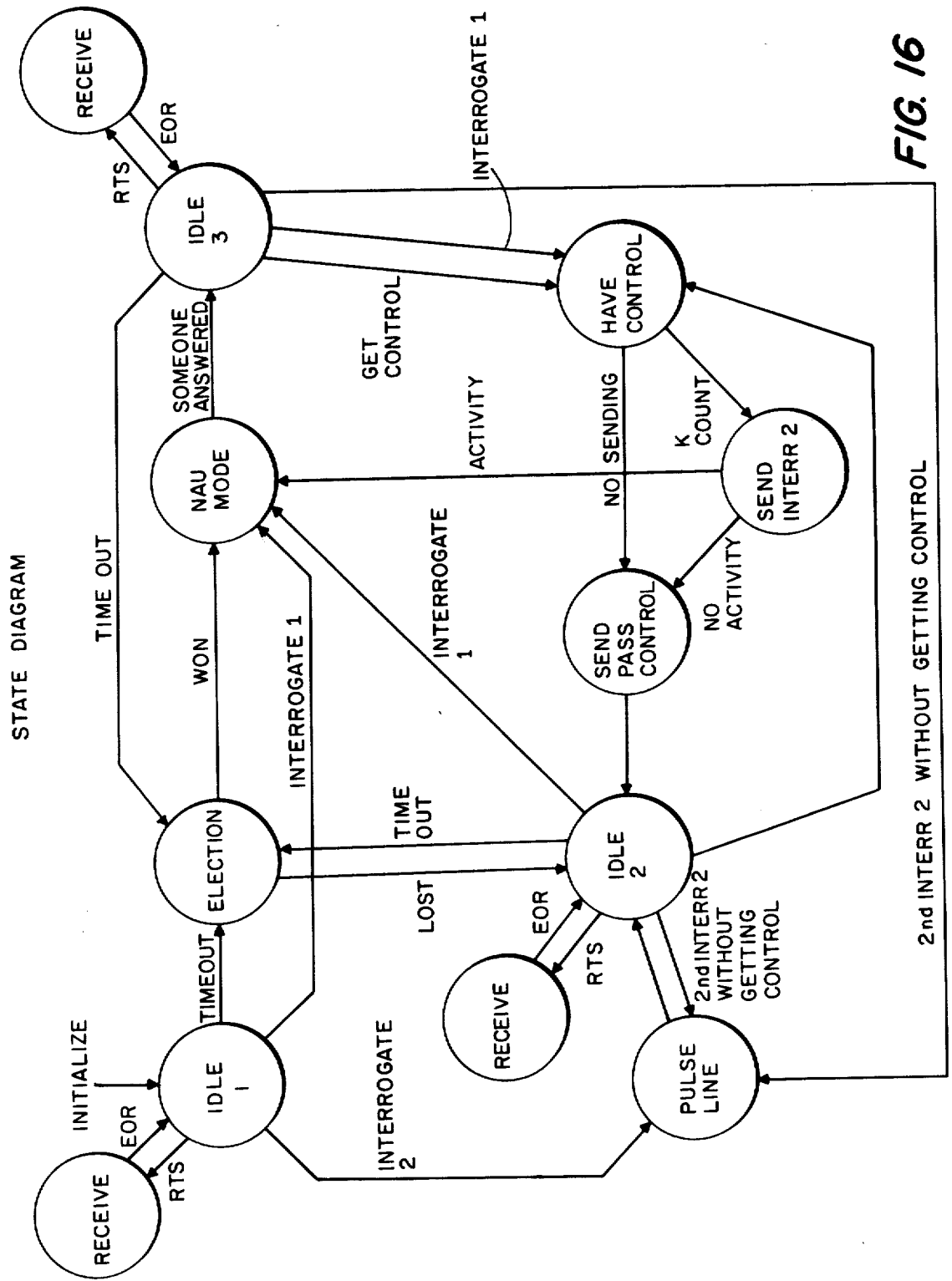
FIG. 16 is a state diagram showing the sub routines performed by the adapter unit.

Read circuits 1000, which is shown in FIG. 15 includes a flip-flop 1010, a 8 bit shift register 1020 which functions as a serial to parallel converter and which outputs into a holding register 1030. The outputs from holding register 1030 are transferred to bus 25 on command signals from microcontroller 600. The parallel to serial converter 1020 may be a Texas Instrument chip number 74LS164 and holding register 1030 may be a Signetics chip number 74LS374.

OPERATION OF MICROCONTROLLER 600

The basic instructions executed by microcontroller 600 are:

1. "PULSE"—Issue a pulse on one of the eight pulse lines emanating from microcontroller 600;

2. "MOVE"—Move a byte of data from any of the eight sources to any of the eight destinations. Should the move involve the scratch pad memory, the instruction specifies the address of the byte;

3. "BRANCH CONDITIONALLY"—If the condition (high level) is satisfied on any of the eight input condition lines, modify the least significant nibble of the program counter in accordance with the field specified in the instruction. If the condition is not met, advance to the next instruction; and 4. "JUMP"—Modify the program counter unconditionally in accordance with the field shown in the instruction.

These instructions are arranged in subroutines so as to perform the function indicated by the state diagram shown in FIG. 15 and in the manner as described below.

INITIALIZE: Following power up, microcontroller 600 disables its send circuits and makes sure that it is disconnected from bus 15. It then carries on some self-diagnostics to insure the integrity of the hardware. Then, if all tests are successful, it proceeds to IDLE state #1.

IDLE: When bus 15 is inactive, each microprocessor runs a time out counter. If there is no activity on the line during the time out period the microprocessor pulses the line once and the adapter unit enters the ELECTION state.

If the microcontroller detects any activity before the end of the time out period, it resets the time out count and holds it at zero. If the activity is a message, the microcontroller jumps to the READ routine. If line activity halts again, the microcontroller starts the time out count again.

If the message is an INTERROGATE 2, "ANY NEWCOMERS", and the microprocessor has not been introduced to the network, it will respond by pulsing the line once. This informs the adapter unit that originated the interrogation that a CONFIGURATION cycle should be performed.

Specifically, the microprocessor will respond to an INTERROGATE 2 in two cases. First, if the adapter unit is in IDLE STATE 1, because it has just been initialized and needs to be introduced to the network. Second, it will respond if it has already responded to an INTERROGATE 2, and has not been given control. In this case, something has probably happened to prevent the network from accepting it. For instance, the adapter unit that originated the last INTERROGATE 2 might have been powered down before it could initiate a CONFIGURATION cycle. In either case the adapter unit should respond by pulsing the line once and waiting.

If the message is addressed to another adapter unit, the adapter unit returns to IDLE.

If the message is "YOU MAY ACQUIRE CONTROL", the microcontroller will take control, unless it is in IDLE STATE 1. Such a message should not occur, because the existence of an adapter unit in IDLE STATE 1 means that it is unknown to the rest of the network.

If the message is an INTERROGATE 1, there is a CONFIGURATION cycle in progress. The microcontroller will join the cycle unless it is in IDLE STATE 3, in which case it will terminate the CONFIGURATION cycle.

If the message is a REQUEST TO SEND (RTS), the microcontroller will jump to the RECEIVE routine.

ELECT: If the idling microcontroller passes the time out period T1 without detecting activity on the bus, it goes into ELECTION mode. This process insures that one and only one adapter unit will acquire control of the inactive network.

First the microcontroller pulses the line once and waits a time interval To. Then it monitors the bus for a time period T2 proportional to its own address multiplied by $\Delta$, where $\Delta$ is twice the time of flight acrosss the network bus. If it detects any activity before that time period T2 is up; it has lost the election. If will then go to IDLE STATE 2.

Since all adapter units in the network will have entered the ELECTION mode within one-half $\Delta$ of each other, the adapter unit with the lowest address will usually reach the end of its count first. When it does reach the end of its count, it has won the election. It then pulses the line to remove all the other adapter units from the ELECTION mode. Then it initiates a CONFIGURATION cycle.

CONFIGURATION: The microcontroller enter the CONFIGURATION mode after receiving an INTERROGATE 1 or winning an election.

It begins by pulsing the line once. Then it sends an INTERROGATE 1 message (ARE YOU THERE) to the adapter unit with the next higher address. Then the adapter unit monitors activity on the network bus for a $\Delta$ time period. If there is no activity, it interrogates the next adapter unit. If it reaches the highest possible address without seeing any activity, it starts at zero and continues. If it reaches its own address, it returns to IDLE.

If the microcontroller detects activity, it writes the address of the responding adapter unit in its Next Adapter Unit Register. This will be the adapter unit that the microcontroller passes control to after it is done. It then goes to IDLE STATE 3. The adapter unit that receives the INTERROGATE 1 will now be in the CONFIGURATION mode. It pulses the line once, notifying the interrogating adapter unit that it exists. After a short period, it starts interrogating its own successors. The CONFIGURATION mode passes around the network in this fashion until the last adapter unit in the cycle interrogates the first. Thus when an adapter unit in IDLE STATE 3 receives an INTERROGATE 1, it ends the CONFIGURATION cycle and it may now acquire control.

HAVE CONTROL: This state always starts by the adapter unit asking its computer whether or not it wants to send to a remote station. If the answer is negative, the microcontroller jumps to the end of HAVE CONTROL. If the driving computer answers positively, the adapter unit jumps to the SEND ROUTINE.

END OF HAVING CONTROL: Before relinquishing control to the next adapter unit the microcontroller checks its K count. The K count is a number incremented each time a valid message appears on the network bus. If the microcontroller finds its K count completed it outputs an "IS THERE A NEW NUMBER" message on the bus. Monitoring activity for the following $\Delta$ period, the microcontroller will determine whether there is a newcomer. If there is a newcomer, (activity is sensed at the bus within the period) then the microcontroller jumps to the CONFIGURATION subroutine. If there is no activity within the $\Delta$ period or if the K count is not completed, the microcontroller sends a "YOU MAY HAVE CONTROL" message on the bus directed to the adapter unit with the number stored in the Next Adapter Unit Register and jumps to IDLE 2 state.

WRITE: This subroutine is used when the adapter unit sends messages on the network bus. This subroutine formats the message properly and appends the check word to it.

READ: This subroutine is used whenever a message appears on the network bus. It retrieves the information imbedded in the message and also validates the message by comparing the appended check word to the one computed by the resident check word generator.

RECEIVE: The entry to this subroutine is from the IDLE state when a "REQUEST TO SEND" message directed to the adapter is sensed on the network bus. The adapter unit relays that fact to its computer and waits for directions. If the computer answers negatively, the adapter unit outputs a message "I CANNOT RECEIVE" which is directed to the sender and goes back to IDLE 2. If the computer's answer is positive, the message going out will be a "CLEAR TO SEND". In this case, a text message appears on the bus. If that message is received successfully (judged by the check words appended to the message), an "ACKNOWLEDGE" message is sent otherwise or "NOT ACKNOWLEDGE" message is sent. The subroutine ends by a jump to where it came from.

SEND: The adapter enters this subroutine when it has control and when its computer instructs it to send a text to a remote adapter unit. First, the subroutine sends a "I WANT TO SEND TO YOU" message to the remote adapter unit using the WRITE routine. Then, it monitors the next message to appear on the network bus. Under normal conditions, the follow-up message is either "NO, I CANNOT RECEIVE" or "CLEAR TO SEND". If it is the latter, the routine pulls the information from the computer memory and formats it (using the WRITE subroutine) in a text message. Whether the message that follows is an "ACKNOWLEDGE", the routine repeats that to its computer. Also if the answer to the original "REQUEST TO SEND" is "NO, I CANNOT RECEIVE", the transmission ends here and that fact is reported to the computer.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A computer network comprising:
   a. a network transmission bus means, and
   b. a plurality of spatially separated computer stations connected to said network transmission bus means, each of said computer stations being capable of either acting as an independent work station or transmitting information to any one or more of said other computer stations over said network transmission bus means or receiving information from any one or more of said other computer stations over said network transmission bus means, each computer station including:
      i. a computer, and
      ii. an adapter unit, each adapter unit serving to interface its computer to said network transmission bus means, said adapter units collectively controlling access to said network transmission bus means by said computer stations, each adapter unit including a controller for controlling the operations of said adapter unit, said controller including a timer for measuring time and generating signals at the expiration of first and second preselected time intervals, a line activity indicator for monitoring said bus for activity and for sending signals indicating the presence or absence of activity to the controller, control means in said controller responsive to said signal indicating the absence of activity over said first time interval for sending a first control signal to a pulsing device, said pulsing device coupled to said bus and operative for sending a first pulse over said bus on receival of said first control signal from said controller, said first pulse having a length at least equal to the largest distance between any two adapter units, said control means in said controller responsive to said signal indicating the absence of activity over said second time interval unique to said adapter unit for sending a second control signal to said pulsing device, said pulsing device responsive to said second signal to send a second pulse over said bus, c. whereby, the second pulse transmitted by the first adapter unit detecting the absence of activity over said second time interval causes each other adapter unit to detect activity before the expiration of its second time interval and wherein said first adapter unit will be in a unique state relative to the other adapter units for the purpose of assuming control over the bus.

2. The computer network of claim 1 and wherein said network transmission bus means comprises a single bi-directional bus.

3. The computer network of claim 1 and wherein said adapter unit further includes:
   a. an address store coupled to said controller for holding a unique number assigned to the adapter unit, and
   b. a control store coupled to said controller for holding the instruction for the controller.

4. The computer network of claim 3 and wherein said adapter unit further includes:
   a. a write circuit coupled to said controller,
   b. a driver circuit coupled to the output of the write circuit for converting the signals from said write circuit to analog levels, and
   c. a receiver circuit for translating the incoming signals from said bus to digital levels.

5. The computer network of claim 4 and wherein said adapter unit further includes:
   a digital phase locked loop and data separator for separating data received from said receiver circuit into clock and data signals, said data being in serial form, and
   b. a read circuit coupled to the output of said digital phase locked loop and data separator for converting serial data received from said digital phase locked loop and data separator into parallel data and sending said data to said controller.

6. The computer network of claim 5 and wherein said adapter unit further includes:
   a. a relay circuit for connecting said driver circuit and said receiver circuit to said bus, and
   b. a switch for opening and closing said relay circuit.

7. The computer network of claim 6 and wherein said adapter unit further includes an internal bus and wherein said controller, said write circuit, said read circuit and said address store are each connected to said internal bus.

8. The computer network of claim 7 and wherein said controller is a microcontroller.

9. The computer network of claim 8 and wherein said pulsing device comprises a switch whose state is operated by said microcontroller.

10. The computer network of claim 9 and wherein said adapter unit further includes a message detector coupled to the output of said receiver circuit for detecting the presence of a message on said bus and sending a signal indicative thereof to said controller.

11. The computer network of claim 10 and wherein said line activity indicator comprises a flip-flop.

12. The computer network of claim 11 and wherein said microcontroller includes a program counter, an instruction decoder, an immediate register, a source decoder, a destination decoder, a comparison circuit, an amend circuit for amending the value in the program counter, a multiplexer, a scratch pad memory, an incrementor and a pulse decoder.

13. The computer network of claim 12 and wherein said digital phase locked loop comprises a plurality of flip-flops, a counter coupled to one of said flip-flops for counting the number of received serialized bits and a synch stripper for stripping out the synch bit.

14. An adapter unit for use in interfacing a computer to a computer network bus and controlling access of said computer to said computer network bus along with other equal adapter units connecting other computers to said computer network bus comprising:
   a. a controller for controlling the operations of said adapter unit, said controller including a timer for measuring time and generating signals at the expiration of first and second preselected time intervals, a line activity indicator for monitoring said bus for activity and for sending signals indicating the presence or absence of activity to the controller, control means in said controller responsive to said signal indicating the absence of activity over said first time interval for sending a first control signal to a pulsing device, said pulsing device coupled to said bus and operative for sending a first pulse over said bus on receival of said first control signal from said controller, said first pulse having a length at least equal to the largest distance between any two adapter units, said control means in said controller responsive to said signal indicating the absence of activity over said second time interval unique to said adapter unit for sending a second control signal to said pulsing device, said pulsing device responsive to said second signal to send a second pulse over said bus,
   b. whereby, the second pulse transmitted by the first adapter unit detecting the absence of activity over said second time interval causes each other adapter unit to detect activity before the expiration of its second time interval and wherein said first adapter unit will be in a unique state relative to the other adapter units for the purpose of assuming control over the bus.

15. The adapter unit of claim 14 and further including:
   a. an address store coupled to said controller for holding a unique number assigned to the adapter unit; and
   b. a control store coupled to said controller for holding the instruction for the controller.

16. The adapter unit of claim 15 and further including:
a. a write circuit coupled to said controller,
b. a driver circuit coupled to the output of the write circuit for converting the signals from said write circuit to analog levels, and
c. a receiver circuit for translating the incoming signals from said bus to digital levels.

17. The adapter unit of claim 16 and further including:
a. a digital phase locked loop and data separator for separating data received from said receiver circuit into clock and data signals said data being in serial form, and
b. a read circuit coupled to the output of said digital phase locked loop and data separator for converting serial data into parallel data and sending said data to said controller.

18. The adapter unit of claim 17 and further including:
a. a relay circuit for connecting said driver circuit and said receiver circuit to said bus, and
b. a switch for opening and closing said relay circuit.

19. The adapter unit of claim 18 and further includes an internal bus and wherein said controller, said write circuit, and read circuit and said address store are each connected to said internal bus.

20. The adapter unit of claim 19 and wherein said controller is a microcontroller.

21. The adapter unit of claim 20 and wherein said pulsing device comprises a switch whose state is operated by said microcontroller.

22. The adapter unit of claim 21 and wherein said adapter unit further includes a message detector coupled to the output of said receiver circuit for detecting the presence of a message on said bus and sending a signal indicative thereof to said controller.

23. The adapter unit of claim 22 and wherein said line activity indicator comprises a flip-flop.

24. The adapter unit of claim 23 and wherein said microcontroller includes a program counter, an instruction decoder, an immediate register, a source decoder, a destination decoder, a comparison circuit, an amend circuit for amending the value in the program counter, a multiplexer, a scratch pad memory, an incrementor and a pulse decoder.

25. The adapter unit of claim 24 and wherein said digital phase locked loop comprises a plurality of flip-flops, a counter coupled to one of said flip-flops for counting the number of received serialized bits and a synch stripper for stripping out the synch bit.

26. A method of placing one out of a plurality of computer stations which are connected to a common network bus and which are equal in the ability to control the bus in a unique state relative to said other computer stations for the purpose of assuming control over said bus comprising:
a. assigning each computer station a unique number,
b. having each computer station monitor said bus for activity,
c. having each computer station that does not detect activity for a predetermined time interval to transmit a first pulse over the bus having a length at least equal to the largest distance between any two computer stations, then
d. having each computer station that has transmitted said first pulse to monitor the bus for activity for a time period related to its assigned number, then
e. having the first computer station that does not detect activity during its particular time period send a second pulse out over the bus causing all other computer stations to detect activity during their particular time periods, whereby said first computer station will be in a unique state relative to said other computer stations for the purpose of assuming control over said bus.

27. The method of claim 26 and wherein the width of the first pulse is at least equal to $\lambda$, where $\lambda$ is equal to $1/v$, where 1 is equal to the largest distance between any two computer stations connected to the bus and v is equal to the propogation speed of electric waves over the bus.

28. The method of claim 27 and wherein each computer station monitors the bus for activity for a time period directly proportional to its assigned number.

29. The method of claim 28 and wherein the time period for monitoring for activity is greater than $\Delta \times n$ where $\Delta$ is equal to twice $\lambda$ and n is the assigned number of the adapter unit.

30. A method of enabling a plurality of computer stations connected to a common transmission bus to decide amongst themselves which computer station should assume control over said bus at all times comprising:
a. assigning each computer station a unique number,
b. having each computer station monitor said bus for activity,
c. continually passing control from one live computer station to another in numerical sequence according to its unique number, and
d. having said live computer stations conduct an election amongst themselves to determine one live computer station to assume control over the bus in the event passing control ceases for a preselected time interval, said election including:
  i. having each computer station that does not detect activity over said predetermined time interval $T_1$ send a first pulse $P_1$ out over said bus having a length at least equal to the largest distance between any two computer stations,
  ii. having each computer station that sends a first pulse out over said bus monitor said bus for activity for a unique time period $T_2$, and then
  iii. having the first computer station whose unique time period expires without detecting activity send a second pulse out over the bus said second pulse causing all other computer stations to detect activity during their particular time periods, whereby said first computer station will be in a unique state relative to said other computer stations for the purpose of assuming control over said bus.

31. The method of claim 30 and wherein
$T_1 > N \times \Delta$;
N = the maximum number of computer stations that can be handled by the bus;
$\Delta = 2\lambda$;
$\lambda = 1/v$;
1 = the largest distance between any two computer stations connected to the bus;
v = the propogation speed of electric waves over the bus;
$P_1 \geq \lambda$;
$T_2 = N \times \Delta$; and
n = the unique assigned number of the computer station.

* * * * *